United States Patent
Patel et al.

(10) Patent No.: US 11,599,270 B2
(45) Date of Patent: *Mar. 7, 2023

(54) VIRTUALIZED-IN-HARDWARE INPUT OUTPUT MEMORY MANAGEMENT

(71) Applicant: MIPS Tech, LLC, Santa Clara, CA (US)

(72) Inventors: Sanjay Patel, San Ramon, CA (US); Ranjit J Rozario, Sunnyvale, CA (US)

(73) Assignee: MIPS Tech, LLC

( * ) Notice: Subject to any disclaimer, the term of this patent is extended or adjusted under 35 U.S.C. 154(b) by 0 days.

This patent is subject to a terminal disclaimer.

(21) Appl. No.: 16/865,851

(22) Filed: May 4, 2020

(65) Prior Publication Data

US 2020/0264783 A1    Aug. 20, 2020

Related U.S. Application Data

(63) Continuation of application No. 14/589,693, filed on Jan. 5, 2015, now Pat. No. 10,642,501.

(Continued)

(51) Int. Cl.
*G06F 3/06* (2006.01)
*G06F 12/1027* (2016.01)
(Continued)

(52) U.S. Cl.
CPC ............ *G06F 3/0613* (2013.01); *G06F 3/068* (2013.01); *G06F 3/0619* (2013.01);
(Continued)

(58) Field of Classification Search
CPC .... G06F 3/0613; G06F 3/0619; G06F 3/0659; G06F 3/068; G06F 3/064; G06F 3/0644;
(Continued)

(56) References Cited

U.S. PATENT DOCUMENTS 7,275,136 B1    9/2007  Chen
7,293,157 B1    11/2007 Parikh et al.
(Continued)

OTHER PUBLICATIONS

Mijat et al., "Virtualization is Coming to a Platform Near You," ARM Limited, 2010-2011, pp. 1-12.
(Continued)

*Primary Examiner* — Gary W. Cygiel

(57) ABSTRACT

Aspects relate to Input/Output (IO) Memory Management Units (MMUs) that include hardware structures for implementing virtualization. Some implementations allow guests to setup and maintain device IO tables within memory regions to which those guests have been given permissions by a hypervisor. Some implementations provide hardware page table walking capability within the IOMMU, while other implementations provide static tables. Such static tables may be maintained by a hypervisor on behalf of guests. Some implementations reduce a frequency of interrupts or invocation of hypervisor by allowing transactions to be setup by guests without hypervisor involvement within their assigned device IO regions. Devices may communicate with IOMMU to setup the requested memory transaction, and completion thereof may be signaled to the guest without hypervisor involvement. Various other aspects will be evident from the disclosure.

26 Claims, 9 Drawing Sheets

Related U.S. Application Data

(60) Provisional application No. 61/925,723, filed on Jan. 10, 2014.

(51) Int. Cl.
  G06F 12/0811 (2016.01)
  G06F 12/0831 (2016.01)

(52) U.S. Cl.
  CPC ........ G06F 3/0659 (2013.01); G06F 12/0811 (2013.01); G06F 12/0833 (2013.01); G06F 12/1027 (2013.01); *G06F 2212/283* (2013.01); *G06F 2212/62* (2013.01); *G06F 2212/683* (2013.01)

(58) Field of Classification Search
  CPC ...... G06F 3/067; G06F 3/061; G06F 12/0811; G06F 12/0833; G06F 12/1027; G06F 12/1081; G06F 2212/283; G06F 2212/62; G06F 2212/683; G06F 2212/1016; G06F 2212/152; G06F 2212/684
  See application file for complete search history.

(56) References Cited

U.S. PATENT DOCUMENTS

| | | | |
|---|---|---|---|
| 2007/0038839 A1* | 2/2007 | Hummel | G06F 12/1081 711/207 |
| 2008/0209130 A1 | 8/2008 | Kegel et al. | |
| 2011/0023027 A1 | 1/2011 | Kegel et al. | |
| 2012/0246381 A1 | 9/2012 | Kegel et al. | |
| 2014/0354667 A1 | 12/2014 | Lin et al. | |

OTHER PUBLICATIONS

Advanced Micro Devices, Inc., "AMD I/O Virtualization Technology (IOMMU) Specification License Agreement," IOMMU Architectural Specification, PID 34434 Rev 1.26—Feb. 2009.

* cited by examiner

11,599,270 B2

VIRTUALIZED-IN-HARDWARE INPUT OUTPUT MEMORY MANAGEMENT

RELATED APPLICATIONS

This application is a continuation of U.S. patent application "Hardware Virtualized Input Output Memory Management Unit" Ser. No. 14/589,693, filed on Jan. 5, 2015, which claims priority to U.S. Provisional App. No. 61/925,723, entitled, "Hardware Virtualized Input Output Memory Management Unit" and filed on Jan. 10, 2014, both of which are incorporated in their entirety herein for all purposes.

FIELD OF ART

The following relates to implementing Input Output Memory Management, and in one more particular aspect, to implementing virtualized-in-hardware input output memory management.

BACKGROUND

An Input/Output Memory Management Unit (IOMMU) provides a capability of mapping a device address from an I/O Device to a Physical Memory Address (PA). Such an IOMMU can be used by I/O Devices that originate DMA traffic. An IOMMU provides memory protection similar to that provided by a Memory Management Unit that protects memory from errant access by programs running on one or more processor cores that use the memory. Thus, an IOMMU can increase I/O throughput and also provide protection and isolation for memory accesses by I/O devices.

SUMMARY

In one aspect of the disclosure, an IOMMU provides a native hardware capability to support IOMMU virtualization. Such an IOMMU can support a fully virtualized mode in which each guest can interface directly with the IOMMU through a defined interface, while the hypervisor maintains control over an interface that maintains isolation among guests and sets appropriate permissions that are enforced by the IOMMU on the guests. In another implementation, an IOMMU is managed by hypervisor and may not have a hardware page table walker. Thus, mappings are maintained by hypervisor in this example. Guests can interface with hypervisor to set up or remove desired mappings.

A Guest Operating System (GuestOS) can execute on computing resources that appear to the GuestOS to be dedicated to the kernel of that GuestOS and programs executing on that kernel. A Hypervisor interfaces with the actual hardware of available computing resources and provides a virtualized view of hardware to the GuestOS. The presence of a Hypervisor introduces an additional privilege level, root, which takes precedence over a kernel mode of a GuestOS, which in turn takes precedence over user mode within that GuestOS. Processor capability and memory can be virtualized. IOMMU functionality also can be virtualized. Hardware support for IOMMU virtualization is in contrast to supporting virtualization of IOMMU functionality by virtualizing an interface to the IOMMU in the Hypervisor itself. Virtualizing the interface for an IOMMU increases in complexity when multiple GuestOSes share the IOMMU. The disclosed aspects of hardware IOMMU virtualization allow software implementing a Hypervisor to be simplified and often provide better performance.

A GuestOS can have access to a hypercall instruction that causes a hypervisor to set up IOMMU tables with a mapping from addresses that have meaning to the GuestOS to physical memory addresses. Subsequently, the IOMMU can function to permit device DMA without further hypervisor intervention, within the confines of how the hypervisor set up the IOMMU tables. However, unmapped memory access attempts would require hypervisor intervention. The mapping can be made with large page sizes so that fewer memory accesses will exit to root. Also, large page sizes provide an opportunity to map an entire guest address space once. Thereafter, a guest that has had a large page size IOMMU mapping can handle device-specific programming within those mappings, without hypervisor intervention. A hypervisor can be invoked if there is a need to arbitrate among competing guests to program the same I/O device.

Implementations of the hardware virtualized IOMMU herein may be software-managed only, have a capability to walk root page tables for a GuestOS and not be software managed, or a combination thereof. For example, a software-managed IOMMU can be used in conjunction with page walking capability.

In another aspect, a single hardware IOMMU supports a completely virtualized IOMMU, a para-virtualized IOMMU, or an unvirtualized IOMMU. Para-virtualized IOMMU operation means that a GuestOS requests hypervisor intervention in order to make a device Direct Memory Access (DMA). Non-transitory media may have stored thereon data from which an integrated circuit can be constructed according to any of a plurality of build options. In particular, these build options may include unvirtualized, para-virtualized, and fully virtualized. Depending on build mode, available operating modes will differ.

DETAILED DESCRIPTION

Figure 1:
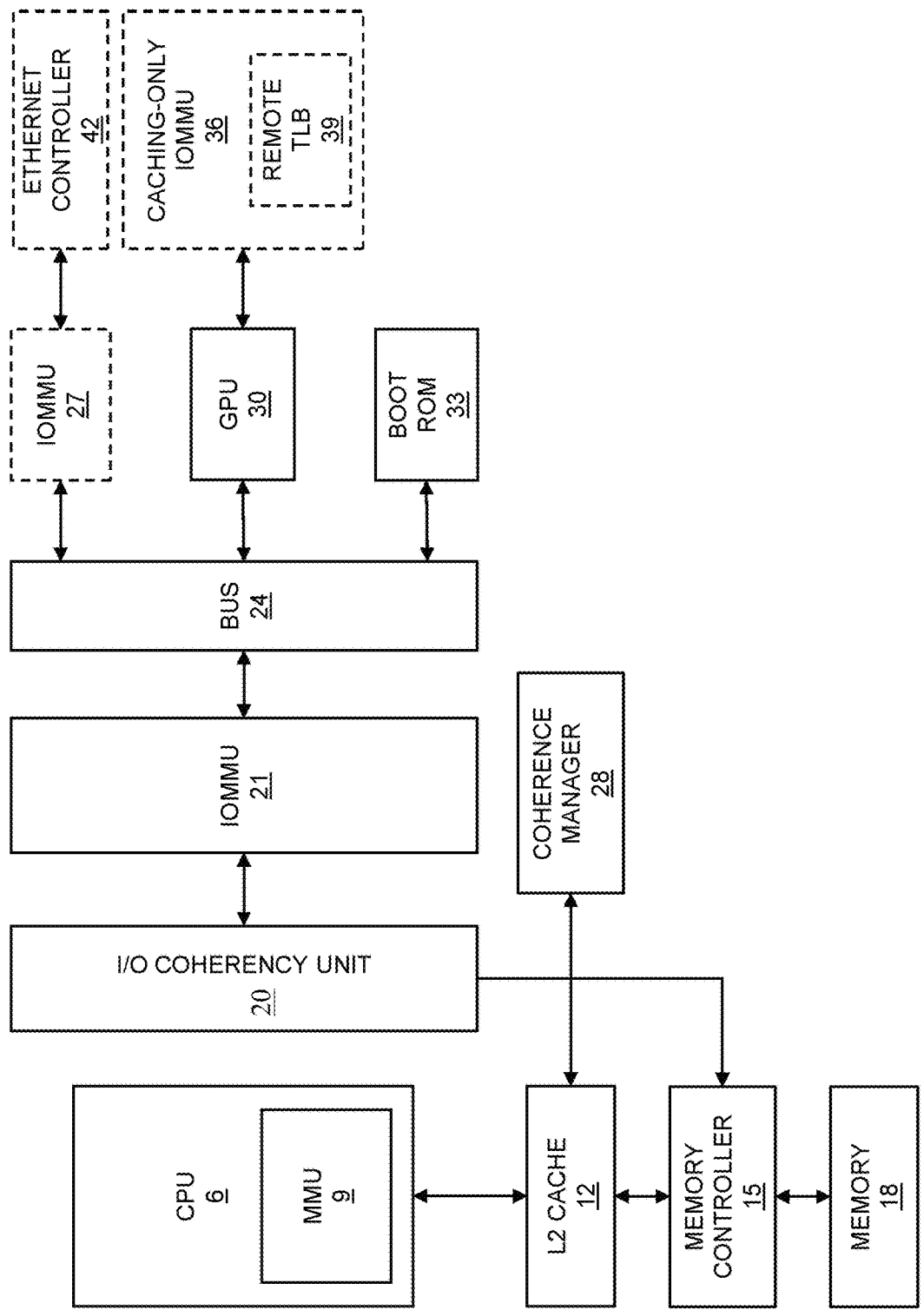
FIG. 1 depicts an example of a compute system architecture in which an IOMMU according to the disclosure may be implemented.

An I/O Memory Management Unit (IOMMU) provides address translation and protection capabilities to read/write accesses that originate from devices in I/O space. These requests are typically for access to memory, such as for Direct Memory Access (DMA) between a device and memory, or in more limited situations, Control and Status Registers (CSRs) within a System-On-Chip (SOC). The following disclosure relates to an IOMMU that can be built to provide hardware-based I/O MMU services in a virtualized environment.

This disclosure uses the following terminology. A Hypervisor abstracts physical execution resources with respect to a Guest Operating System, and a specific abstraction in which a given Guest OS executes can be called its Virtual Machine (VM). A Physical Address (PA) refers to an address in physical memory, whether in a Virtualization (VZ) mode or not. In a VZ mode, the following further terminology is used: a Guest Physical Address (GPA) refers to a Guest OS's view of physical memory in its Virtual Machine (VM), and a Root Physical Address (RPA) refers to true physical memory, which also is a Hypervisor's view of physical memory. A Device Table (DT) contains data that maps an Input Output (I/O) device to related information, such as an I/O page table base address and a Group IDentifier (GroupID). An I/O Page Table (IOPT) contains data that maps I/O device addresses to physical addresses in a system memory. A Translation Lookaside Buffer (TLB) buffers these translations. Various other terminology is introduced in context.

A virtualization environment can be specific to a particular processor architecture, such that virtualization can be implemented as an extension to such processor architecture. In an example, a Virtualization Application Specific Extension (ASE) for a MIPS™ processor architecture can be implemented. In virtualized environments that have an IOMMU according to one implementation of the disclosure, Guest OSes have the capability of programming I/O devices, if permitted. So, a GuestOS can be permitted to program an I/O device as if it owned it, without recurrent hypervisor intervention. Guest OS physical addresses are translated to root physical addresses through a TLB or by using a page table. The IOMMU will also provide protection against errant device programming attempts by a guest OS.

In one aspect, IOMMUs implemented according to the disclosure are software-managed only, which means that address mappings in the IOMMU are programmed by a hypervisor for each guest, or for root address translation. In such an implementation, memory mappings would be comparatively static, as no capability would exist to service a translation miss by the IOMMU and then restart a particular device request. For example, mappings can be static through an active time of a GuestOS or a thread executing in a GuestOS on an execution core. In such implementations, devices that require or benefit from dynamic page management would implement their own MMUs that would have a hardware-implemented page walking capability. In such instances, the IOMMU still prevents spurious accesses to memory.

In another implementation, an IOMMU according to the disclosure provides a page walking capability. In a specific example, such an IOMMU can walk root page tables on behalf of guest requests, in order to map Guest Physical Addresses to Root Physical Addresses. A TLB may be provided, so that if a TLB miss occurs, a page walk can occur in order to populate the TLB and continue with the request that originally missed in the TLB. In implementations such as these, devices may still implement their own MMUs. Additionally, IOMMU page table caching can be distributed in such implementations, where the caches are managed by a central IOMMU.

In some aspects, a Virtualized IOMMU according to the disclosure provides support for operation of multiple guest contexts. In one implementation, each GuestOS controls a non-overlapping set of I/O devices. In an implementation, physical I/O devices can be virtualized to present non-overlapping virtual I/O devices to each GuestOS. As will be explained, aspects of the disclosure provide simplification to a hypervisor portion of a virtualized environment.

Where a number of GuestOSes using the IOMMU is relatively low, a hypervisor may be able to achieve a static mapping between guest addresses and physical memory addresses within a TLB. However, in other implementations, too many guests may need IOMMU services, and in such an instance, the hypervisor would more actively manage the contents of the TLB based on the context switching behavior of the GuestOSes. Also, page sizes indexed by the TLB can be selected to be relatively large, so that each GuestOS requires relatively few distinct entries in the TLB. Specific page sizes depend on an implementation, including how much memory is available as well as how many GuestOSes may need to use that memory.

In further overview, the disclosure presents an example IOMMU implementation using programmable CSRs to configure the IOMMU. These CSRs are accessible through MMIO address space. Such IOMMU supports an I/O Page-Table for translating device-originated guest physical addresses to root (real) physical addresses. Any CPU accesses to I/O devices are first checked against the Device Table of the IOMMU to determine if the guest has permission to access the device. If not, an error is signaled.

The Hypervisor can interact with the IOMMU through a Command Queue (CQ). Commands available to the Hypervisor include management commands, such as commands for controlling table contents and translations cached in the IOMMU. In a fully virtualized operating mode, each GuestOS also can initiate transactions by submitting commands to a respective CQ for that GuestOS. The IOMMU services the CQs first by a permissions check and then by checking for an appropriate address mapping within a TLB. On a miss, the IOMMU can walk a page table to identify the address and restart the transaction. The IOMMU monitors device access to the IOMMU and checks programmed state for protocol errors. Responsive to an error, the IOMMU can terminate device access and log an error in an Error Log. A valid event in the Error Log will interrupt the hypervisor. Each GuestOS also may have a respective error log and respond to errors. The IOMMU would store or cache translations in the TLB for acceleration of translation requests. An extent of such caching is implementation dependent.

In another example implementation, no hardware page table walker is provided in the IOMMU, which then requires that the hypervisor set up and maintain all address translations available to the IOMMU. In one implementation according to this example, GuestOSes may be modified to include a hypercall which can be used to set up appropriate mappings, preceding a device DMA transaction executed on behalf of that GuestOS. The hypercall requests the hypervisor to set up a particular translation. Such a hypercall can be included in kernel code for the GuestOS, or a driver for the device, loaded for the GuestOS, may include the hypercall. A GuestOS may request setup of a range of GPAs that have large page sizes, so that these mappings may be useful for a number of device accesses. The usage of such a hypercall or other pre-fetching strategy may still be used with an IOMMU that provides a page walker. Such hypercalls may also allow debugging and TLB entry invalidation.

In some implementations, a Virtualized IOMMU according to the disclosure does not support the capability of allowing an I/O device to be programmed with a virtual address, from the perspective of a GuestOS. Such capability would require an (additional) table walk to translate the GuestOS virtual address to a Guest Physical Address, as well as availability of more page tables to the IOMMU. Instead, I/O devices are programmed with physical addresses, from a GuestOS perspective (which are GPAs, which are translated into RPAs as explained). However, such an IOMMU may still permit guest-privileged software to program devices; such capability is provided by the hypervisor setting up appropriate mappings for the guest access within a CPU MMU accessible by the GuestOS.

Further details and related aspects concerning such implementations are explained below.

Overview of Example System

Now turning to FIG. 1, a block diagram of an example system is depicted. A Central Processing Unit (CPU) 6 contains an MMU 9. CPU 6 communicates with an L2 Cache 12, which in turn communicates with a memory controller 15, which communicates with a memory 18. An IOMMU 21 interfaces CPU 6 with a bus 24. A GPU 30 connects with bus 24. A boot ROM 33 can be attached to bus 24. CPU 6 would execute a hypervisor (not depicted) and one or more GuestOSes. A coherence manager 28 can operate to manage coherency of L2 cache 12, in the presence of other processing elements that may be operating on the same data. For example, coherence manager 28 may be used in a cluster of processors, of which CPU 6 represents one processor. In the context of memory coherence, the term processor refers to any hardware structure capable of needing to consume memory that may be changed by another hardware structure, or which may change data located in a memory that may be consumed by another hardware structure, such that currency and atomicity of the data being read and written by multiple hardware structures can be managed. Coherence manager 28 may include L2 cache 12, in an implementation.

The example location of IOMMU 21 is appropriate for a situation where there are multiple masters on bus 24. If there is only one master on bus 24, such as an Ethernet controller 42, then an IOMMU may be positioned as depicted by IOMMU 27. Another possible configuration is to have a central IOMMU with a Caching Only IOMMU associated with a GPU (for example).

In some implementations, a Caching Only (CO)-IOMMU 36 that contains a remote TLB 39 may be provided with GPU 30, and can cache TLB information for use by GPU 30. CO-IOMMU 36 provides address translation and protection capability in a distributed manner where I/O devices may have attached MMUs. In an implementation, each CO-IOMMU requests translations only through a main IOMMU (e.g., IOMMU 21) and does not walk I/O page tables itself (and if a main IOMMU does not walk page tables, then data available from caching only IOMMUs may be a subset of data in the main IOMMU populated by a hypervisor).

Figure 2:
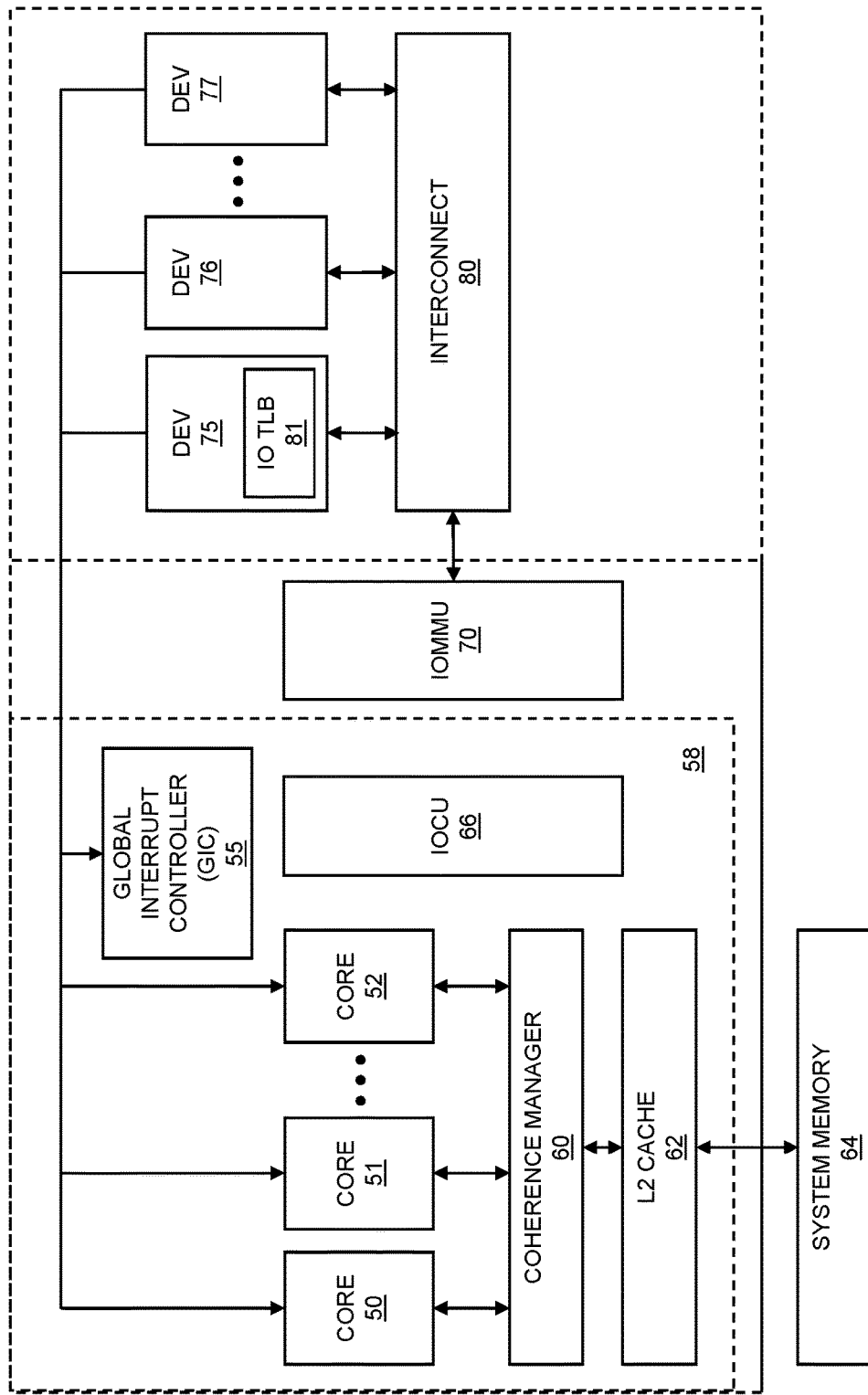
FIG. 2 depicts an example of a System on Chip (SOC) arrangement in which an IOMMU according to the disclosure may be implemented.

FIG. 2 depicts a block diagram of an example SOC. A set of cores 50-52 communicate with a coherence manager 60. Coherence manager 60 maintains memory coherence of an L2 cache 62, which couples with a system memory 64. Coherence manager 60 also may provide coherence management for private L1 caches for each core 50-52. A Global Interrupt Controller (GIC) handles interrupts on behalf of cores 50-52. An I/O controller 66 handles I/O transactions between elements of compute cluster 58 and an IOMMU 70. IOMMU 70 communicates with an interconnect 80 that couples devices 75-77 to IOMMU 70. IOMMU 70 can participate in setting up direct memory access transactions that occur between devices 75-77 and system memory 64.

FIG. 2 depicts that an I/O TLB 81 can be provided with device 75, as an example. Such TLB can host mappings provided from IOMMU 70, but does not walk page tables or otherwise directly receive mappings. Devices 75-77 can generate interrupts that are received and processed by GIC 55. Since IOMMU 70 is a shared resource, and in one example, is managed by a hypervisor, access arbitration among multiple cores and/or multiple threads executing on such cores can be transparent to IOMMU 70. A multi-processing capable hypervisor would be required to manage multiple coexisting GuestOSes in such an implementation.

Build and Operating Modes

A system in accordance with the examples of FIGS. 1 and 2 can be produced using data provided on a non-transitory machine readable medium that allows a variety of build modes for an IOMMU. The build modes include an IOMMU that does not have specific hardware structures to support virtualization, a build mode that supports para-virtualization, and a build mode that supports full virtualization. A para-virtualized build mode IOMMU can support para-virtualization and non-virtualized operating modes. A fully virtualized IOMMU can support those operating modes as well as a fully virtualized operating mode.

The Para-Virtualized mode relies on GuestOSes that have been modified to make hypercalls to a Hypervisor to set up device memory access. Thus in para-virtualization, a Device-Table is Hypervisor managed. Also, a Command Queue and Error Log are Hypervisor managed. Accordingly, entries in the Device-Table, Command Queue, and Error Log are tagged with identifiers for a GuestOS associated with those entries (a GuestID). A Fully-Virtualized mode assumes that GuestOSes can be unmodified (unmodified for virtualization purposes).

FIGS. 1-2 presented two different examples of how one or more IOMMUs may be provided in a system or apparatus, and arranged relative to other functions. The following presents example implementation details for such IOMMUs. Different numbering is used in these figures, such that it would be understood that these example implementation details apply to implementations of the examples of both FIG. 1 and FIG. 2.

Figure 3:
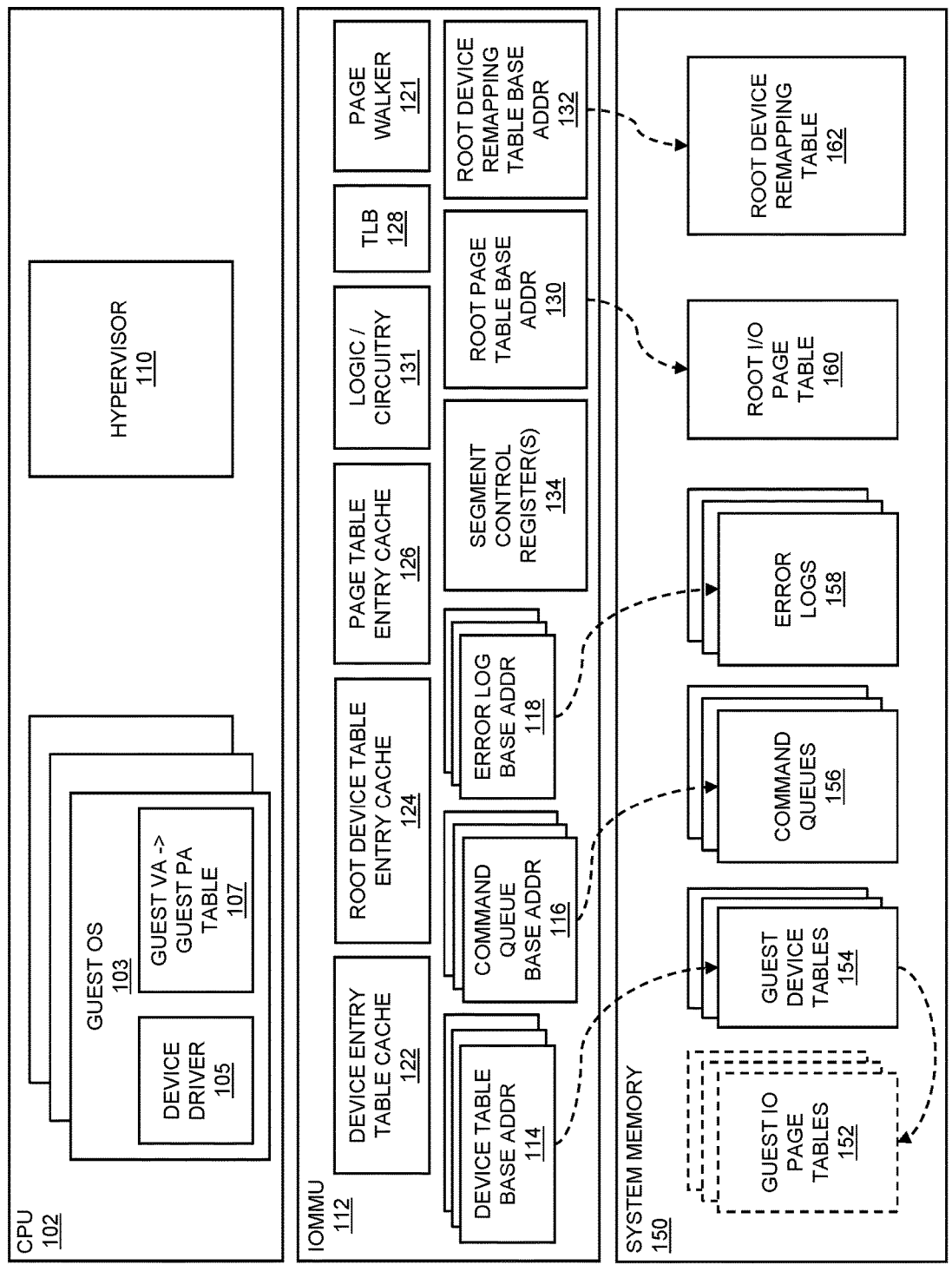
FIG. 3 depicts a block diagram of an example IOMMU according to the disclosure.
Figure 4A:
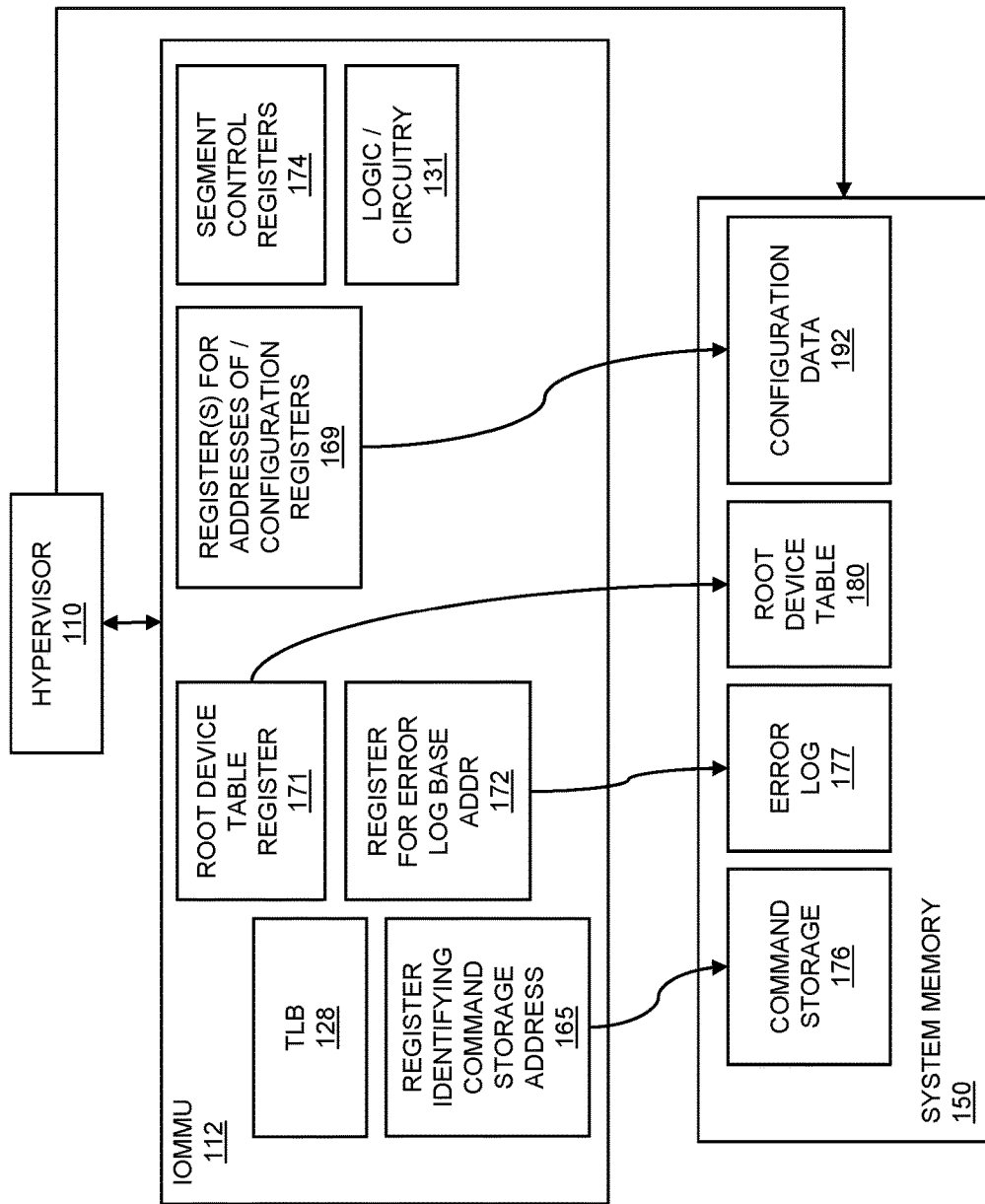
FIG. 4A depicts an example block diagram of an IOMMU with memory-mapped data structures, where locations in memory for specified data and other elements are identified by registers in IOMMU.
Figure 4B:
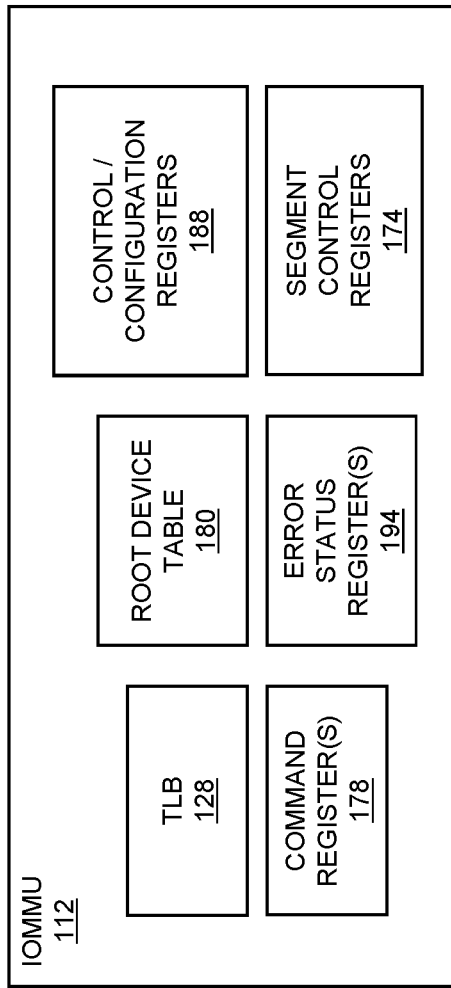
FIG. 4B depicts an example block diagram of an IOMMU with hardware-resident data structures.

FIG. 3 depicts an example system configuration in which an IOMMU 112 has a full-virtualization build capability, and is being used in a fully-virtualized mode, in which GuestOSes can individually control mappings within respective authorized address spaces, without involvement of the hypervisor. FIGS. 4A and 4B depict examples of an IOMMU implementation in which a hypervisor sets up mappings, and each I/O request is serviced using those mappings. By contrast with FIG. 3, individual GuestOSes do not maintain respective GuestIO page tables or device tables, and implementations of the IOMMU of FIGS. 4A and 4B may not provide a hardware page table walker.

In FIG. 3, a CPU 102 executes a set of GuestOSes, with GuestOS 103 enumerated. GuestOS 103 includes a device driver 105, for an I/O device (not depicted). GuestOS 103 also may have access to a Guest Virtual Address (GVA) to GPA table 107. Such table also may be implemented as a CPU page table handled among multiple guests. CPU 102 also executes a hypervisor 110.

IOMMU 112 includes a set of registers that each identify a base address for a particular system memory resident. In the example IOMMU 112, these base addresses include a set of device table base addresses 114, a set of command queue base addresses 116, and a set of error log base addresses 118. In a fully-virtualized mode, each of 112, 114, and 116 may have an entry for each GuestOS, which reference guest I/O page tables 152, guest device tables 154, guest command queues 156, and guest error logs 158. IOMMU 112 also includes a root page (PTBA) table base address 130 and a root device remapping table (RDRT) base address 132, which identify locations of root I/O page table 160 and RDRT 162 in memory 150.

IOMMU 112 also includes caches for caching information obtained from these tables: a device table entry cache 122 stores entries retrieved from device tables, a root device table entry cache 124 stores entries from the root device table, and a page table entry cache 126 stores entries obtained from page tables. Cache 122 and cache 124 can be implemented as a single physical cache or as separate caches. If implemented as a single cache, then tags would have one or more bits to distinguish root from guest entries. IOMMU 112 also includes functional logic 131, which can be implemented as circuitry comprising logic gates and interconnect to perform tasks such as retrieving and storing data in the caches, updating TLB 128, responding to new commands, adding errors to the error log, and so on. The circuitry and interconnect used to implement these functions can be understood by those of ordinary skill in the art, based on the description of the functions and what elements may read and/or write to each such element depicted in the figures.

In this example implementation, each GuestOS can be allowed to set up a respective Device Table, and has access to a respective Command Queue and Error Log, as if it has its own independent instance of each. A GuestOS can write commands to be implemented by the IOMMU, such as an invalidation of a cached Device Table Entry (DTE), invalidation of an I/O Page Table Entry and so on. The IOMMU reads each Command Queue 56.

In an example where an IOMMU includes a page table walker 121, a GuestOS can generate an initial GuestOS MMIO access to device programming address space, which, if not yet mapped, will cause a page-miss. Hypervisor will choose to grant access to the GuestOS, or pend the request. Hypervisor will program RDRT 162 to indicate which GuestOS has been granted access to a Device (if any). Each device access first causes a determination of which GuestOS that access is associated with by a lookup in RDRT 162. Thus, in a fully-virtualized mode according to this implementation, there can be n GuestOSes, resulting in n+1 device tables, and command and error queues, and a single RDRT 162.

This example shows that these data structures are implemented as memory-based data-structures. Alternatively, some or all of these structures may be configured as tables (e.g., fixed size tables) in IOMMU 112. A reason for using in-memory data structures is that a software view of IOMMU 112 can be independent of a hardware implementation of IOMMU 112. IOMMU 112 can scale the implementation and provide various optimizations, such as caching I/O Page Table PTEs, while software's view of IOMMU 112 remains static. Further, software may be able to tolerate longer latencies of interaction with IOMMU 112 in such an implementation. However, some designs (such as designs for embedded uses) and related software may be implemented by storing the data described below in hardware-implemented memories that are private to IOMMU 112. Here, the term "software" is used to describe processes executing on hardware execution resources and not to describe software programs per se.

In the context of an implementation where GPAs are used, but not Guest Virtual Addresses, I/O page tables 152 provide mappings between GPAs and RPAs and are indexed by GPA. Devices also can share Page Tables through a common device Group-ID. A Group-ID is used in the tag for matching translation entries in Translation Lookaside Buffer (TLB) 128 implemented within the IOMMU.

The following paragraphs provide further detail concerning the various data structure identified above. Various elements in the detail below are given names, such as names for particular types of data, or collections of data. These names are provided for ease of understanding and convenience, but not to imply any requirement that implementations refer to like data with similar names, or to necessarily provide the same data, or to organize that data in accordance with the examples presented.

Device Table

A Device Table (DT) (e.g., guest device tables 154) is a structure in memory than can be indexed by a device number associated with a device request. Contents of the device table may be initialized by hypervisor 110 and read by IOMMU 112. An entry for a particular device provides device-specific information related to translation and access permissions. The DT associates access permissions with devices. In operation, IOMMU 112 indexes a DT with a device number obtained from a device request. The DT also can map a device request to a specific GuestOS through a GuestID. The DT may be configured to be a fixed-size table in the IOMMU or be implemented as a memory-mapped table.

Hypervisor 110 manages/tracks ownership of devices by GuestOSes. Hypervisor 110 must initialize Device Table entries with appropriate GuestIDs, before granting a GuestOS access to a device in I/O space (such initialization can be in response to a trapped request or an initialization that occurs in advance of a request). Once the Device Table is initialized, then any GuestOS device reads or writes will be checked against the Device Table for correct association of GuestID. In a situation where devices can be associated with only one GuestOS at a time, different GuestOSes can use the same device at different points in time, and hypervisor 110 initializes and reinitializes corresponding Device Table entries to support ownership of the same device by different GuestOSes. Hypervisor 110 uses invalidate commands to ensure an appropriate context is established. An example implementation of a DT Entry (DTE) is in Table 1, below.

TABLE 1

| Field Name | Field Abbreviation | Description |
|---|---|---|
| Page Table Base Address | PTBA | Base Address of I/O Page Table associated w/Device. (Upper 32 bits used only for 64 bit operation) |
| Group ID | GRPID | Group-ID for device. Multiple devices can belong to a common group. Devices sharing a Group ID share I/O page tables. |
| Quality Of Service | QOS | Quality of Service attributes for a given Device. |
| Translate Bypass Enable | BYPEN | 1: Device bypasses IOMMU translation. 0: Device must translate through IOMMU. In Virtualization, all Device translations must at least translate through Root TLB, unless device is enabled by Hypervisor. See DRTE[BYPEN]. |
| Remote TLB Translation Caching | RTLBC | 1: Cache device page-walk translations locally in IOMMU. 0: Disallow caching in IOMMU. This is an optional field and implementations need not support remote TLB. |

TABLE 1-continued

| Field Name | Field Abbreviation | Description |
|---|---|---|
| Remote TLB Supported | RTLBS | 1: This Device supports a remote TLB and can make requests for page-walk translations to IOMMU.<br>0: This Device does not support a remote TLB.<br>Note: Default is 0 i.e., RTLB not supported for Device. |
| Page-Fault Logging Disabled | PFLD | 1: Page-Fault logging disabled.<br>0: Page-Fault logging enabled |
| Page Table Base Address | PTBA | Base Address of I/O Page Table associated w/Device. Lower 32 bits of address; can be 4 KB aligned. This is physical address, either a GPA, if Guest programmed, or an RPA if Hypervisor programmed. |
| Device Read Enable | RDEN | 1: Device allowed to Read<br>0: Device not allowed to Read |
| Device Write Enable | WREN | 1: Device allowed to Write<br>0: Device not allowed to Write |
| Valid | V | 1: DTE is valid.<br>0: DTE is not valid. |

By way of further example, entries in a device table may be simpler than the example of Table 1. For example, an entry in a device table may have only a valid bit and a GuestID. A base address of a page table may be omitted, if the IOMMU does not support page walking. In such an instance, a device address (e.g., a GPA) can be used to identify a corresponding GuestID in the DT, which is then used to identify an entry in the IOMMU TLB.

Entries in DT entry cache 122 may be tagged with a GuestID, GroupID, and device address. However, GroupID is optional. Providing DT entry cache 122 is optional, and some implementations may require that a hypervisor establish and maintain mappings within a device table, and may omit hardware page walking capability.

Quality of Service (QOS) attributes may be specified per device. QOS bits may have a meaning established by a usage convention being employed. In one usage convention, QoS bits are used to determine an allocation of DMA bandwidth among contending devices. Such an allocation approach may restrict sideband information available about other DMA devices within a system, to other DMA devices, based on response or throughput metrics. Other usages may be to support different kinds of DMA transactions differently according to the QOS bits, which may be used to indicate a kind of computation being performed by GuestOS processes associated with each device. QOS also can be used to prioritize requests based on latency constraints.

A Device Remap Table (DRT) 162 may be provided. DRT 162 remaps certain fields of device tables to require Hypervisor intervention, such as for verifying access controls and implementing other management functionality, such as quality of service enforcement. Thus, guests can populate respective guest tables and permissions can be verified by IOMMU 112 using DRT 162. In an example, DRT 162 contains the same number of entries as the Device Table. In an example implementation, each DRT Entry (DRTE) is specified so that each Device maps to a unique GuestOS. In such an implementation, to allow for sharing of a Device between different GuestOSes (e.g., for multi-threading), such Device must be programmed to issue or use a different DeviceID for each GuestOS-initiated transaction. In another implementation, devices may issue DeviceIDs on a thread-specific basis, and these thread-specific DeviceIDs can be associated with specific GuestOSes. Other approaches to allowing sharing of a device among multiple GuestOSes can be provided, and these are example implementations. An example DRT entry is provided below, in Table 2.

TABLE 2

Example Device Remapping Table (DRT) Entry

| Name | Abbreviation | Description |
|---|---|---|
| Quality of Service | QOS | Quality of Service attributes for a given Device. |
| Guest ID | GUID | GuestID[7:0] |
| Translate Bypass Enable | BYPEN | {Guest Device Table[BYPEN], Device Remap Table[BYPEN]} should be interpreted together as follows:<br>11: Reserved.<br>X1: Device bypasses both Guest and Root TLB. Only allowed for Root (Hypervisor) initiated DMA.<br>10: Device bypasses Guest TLB but not Root TLB.<br>00: Device must translate through both Guest & Root TLB. |
| Read Override | RDOV | 1: Device allowed to Read.<br>0: Device not allowed to Read.<br>This allows Hypervisor to override Guest R/W permissions. If GCFG[VZEN] = 1, then (Guest) DTE[RDEN] must be ANDed with RDOV, along w/PTE RD permission. |
| Write Override | WROV | 1: Device allowed to Write<br>0: Device not allowed to Write<br>This allows Hypervisor to override Guest R/W permissions. If GCFG[VZEN] = 1, then (Guest) DTE[WREN] must be ANDed with WROV, along w/PTE WR permission. |
| Device Valid | V | 1: Device Table Entry is valid.<br>0: Device Table Entry is not valid.<br>If GCFG[VZEN] = 1, then (Guest) DTE[V] must be ANDed with DRTE[V].<br>Else Device Valid is DTE[V]. |

A number of devices capable of being physically supported in an IOMMU implementation, or system including such, may be fewer than a number of entries in the Device Table. Unused entries should have valid bits initialized to invalid. In addition, in Virtualization mode, unused entries in the DRT should have valid bits initialized to invalid. IOMMU implementations according to the disclosure may support dynamic addition and removal of I/O devices, which would cause entries in the device tables and/or DRT to be added, removed, or status updated accordingly.

At a minimum, Device R/W permissions obtained from a DTE are ANDed with R/W permissions from a Page-Table PTE to determine a final R/W permission (in implementations where such structures are provided). Additionally, in Virtualization mode, device R/W permissions are further ANDed with read or write permissions maintained in the DRT (DRTE[RDOV/WROV] in Table 2, above).

QoS can be defined in both DTE and in a DRTE for a given device. The QoS information in a DRTE can be a superset of the information in a DTE, and DRTE can override information in the DTE, in an example. For example, if GCFG[VZEN]=1 & GCFG[CEQM]=1, then GUID is used to determine whether device access has been initiated by Guest or Hypervisor. If GUID is 0, then device is Hypervisor enabled, else it is Guest enabled.

Page Tables

Page Tables (PTs) maintained by hypervisor are used to translate device addresses to root (or real) physical addresses.

Directory Pointers in the I/O Page Table referenced by a Device Table Entry are always physical. In Virtualization mode, if the Device is programmed by Guest, then the pointer is a GPA, else if it is programmed by Hypervisor, then the pointer is an RPA. A GPA must always be walked through the Root Page Table to generate an RPA. Directory Pointers in the Root Page Table are always RPA.

In an example implementation, a format of the Page Tables can follow a format of CPU page tables used for a processor architecture with which the IOMMU will be used. However, in an example implementation, a base address of the Table, and intermediate directory pointer addresses, are RPA (root physical addresses). This may be in contrast with CPU Page Tables, which may be virtually addressed. A CPU Page Table may also be accompanied by an Address Segment Map which allows for an unmapped translation of virtual to physical addresses within a specific segment of memory (e.g., kseg0 in MIPS™ architecture). The IOMMU on the other hand does not have an accompanying Address Segment Map and thus cannot translate guest virtual to physical addresses without a Page Table.

Commands and Command Queues

Some implementations may supply a hypervisor-managed command queue; other implementations may provide a hypervisor-managed command queue and per-GuestOS command queues. Some implementations may support one or more registers in which commands can be inserted, which may not be managed as a queue.

In an example, queued commands are dequeued and processed by IOMMU 112. These commands can be used, for example, to invalidate device-related states such as a DTE (Device Table Entry), or a PTE (Page Table Entry), obtained on a page-table walk of the I/O Page Table, which are locally cached in the IOMMU. The invalidation commands allow software to keep the state of IOMMU 112 consistent with the state of the Device Table, and Page Table in memory. Other commands can be provided, such as prefetch and debug commands.

A Command Queue can be implemented as a circular buffer in memory, or alternatively in IOMMU 112, managed by hypervisor. Commands are inserted by software (hypervisor and/or guests, depending on operating mode) into the buffer through a tail pointer (Command Queue Tail Pointer (CQTP)), whereas commands are read from the buffer by the IOMMU 112 through a head pointer, (Command Queue Head Pointer (CQHP)). These pointers also can be read and writable by software, such as by hypervisor in a para-virtualized operating mode, or by guests in a fully virtualized operating mode (although guests would be able to write only to the pointers associated with its respective command queue). Other than regular software writes and hardware reads, the state of the pointers may be modified on initialization to read empty, or when a command error is encountered, and thus the Command Queue needs to be reinitialized.

Where these command queues are implemented in system memory, the terms CQTP and CQHP are distinguished from the related memory addresses of the Command Queue in memory. In particular, CQTP and CQHP can be implemented as indices, whereas CQ Tail and Head Addresses (CQTA and CQHA) refer to respective physical memory addresses. If the CQ is implemented in IOMMU 112 itself, then no CQ Tail/Head Address is implemented.

If CQHP and CQTP are not equal, then unread commands are present in the Command Queue. IOMMU 112 will increment CQHP by the number of commands read. In some implementations, a requirement can be that CQTA writes are kept coherent within the cache and memory hierarchy such that a read from CQHA obtains the latest copy of the command at the head of the Command Queue.

IOMMU Commands

Table 3, below, enumerates example commands that can be implemented in an IOMMU (e.g. IOMMU 112) according to the disclosure. As noted above, not all of these commands may be provided in different implementations, commands may be called different names without changing their effect, and some implementations may provide other commands.

TABLE 3

| Command Type | Command Description | Requirements | Comment |
| --- | --- | --- | --- |
| INVALIDATE_DTE | Invalidate cached DTE (Device Table Entry) | Invalidate tag {(GuestID), DTE#} in | GuestID is VZ Optional. |
| INVALIDATE_IOMMU_PAGE | Invalidate cached Device Address ->(G)PA specified by | Invalidate tag {(GuestID), GroupID, DVA} in TLB | GuestID is VZ Optional. |
| INVALIDATE_IOMMU_PAGE_ROOT | Invalidate cached GPA/RVA-> RPA specified by Page. | Invalidate tag {(GuestID), GroupID, GPA/RVA} in TLB | GuestID is VZ Optional. |
| INVALIDATE_IOMMU_GROUP | Invalidate all cached translations related to a Group. | Invalidate tag {(GuestID), GroupID} in TLB | GuestID is VZ Optional. |
| SYNC | Ensures completion of all invalidation commands prior to it, or between it and a prior SYNC command. | | |
| LOAD_DTE | Loads DTE into DTE$ | Load by tag {(GuestID), DTE#} | GuestID is VZ Optional. |
| LOAD_IOMMU_PAGE | Load I/O DVA->(G)PA specified by Page. | Load tag {(GuestID), GroupID, GPA/RVA} in TLB | GuestID is VZ Optional. |
| LOAD_IOMMU_PAGE_ROOT | Invalidate cached GPA/RVA-> RPA specified by Page. | Invalidate tag {(GuestID), GroupID, GPA/RVA} in TLB | GuestID is VZ Optional. |

GuestID, where specified, only applies to Virtualization mode. A GuestID for a particular transaction can be obtained from a Device Remapping Table, if available. If a remote TLB is supported, invalidate commands may be provided for invalidating entries in the remote TLB. There need not be commands specific to the Hypervisor, as the Hypervisor can, through its own Command Queue, invalidate all entries, including GuestOS entries, by specifying the appropriate GuestID and its own cache entries. GuestOSes do not specify their own GuestID. GuestIDs are associated with a respective Command Queue. The GuestID is used for example to index the I/O Page Table, or to associate an error with a specific guest, as explained in the error log description below.

A SYNC command is complete if all invalidation commands between it and a prior SYNC command are completed. The SYNC command indicates completion either through interrupt by setting STATUS[SYNINT] or by updating a semaphore in memory which a waiting process can poll. The address of the semaphore and store data is given in the SYNC command. If the completion of a SYNC is indicated through interrupt, then software must clear STATUS[SYNINT] when interrupt servicing is finished.

An INVALIDATE_DTE command is complete if the DTE cache entry has been invalidated for the tag associated with that command, and there are no outstanding reads to memory for that specified entry in the DT. The INVALIDATE_DTE command will specify whether the invalidation will force a reload of the entry from the Device Table. This may often be helpful if software reclaims pages related to a device and then reinitiates DMA from the device.

An INVALIDATE_IOMMU command is complete if the TLB has been invalidated by tag, and there are no outstanding reads to memory for the specified entry in the I/O page table.

In an implementation, commands are always read in FIFO order, but may be executed concurrently. Software, e.g., a GuestOS or Hypervisor, may follow a series of invalidations by a SYNC command to ensure completion is visible to software.

The address is assumed to be a PA in non-Virtualized mode. It is a GPA if SYNC is written by Guest, or an RPA if SYNC is written by Hypervisor. Command Queue and Error Log associated with Hypervisor is always labeled w/GNUM=0. If GPA, then it must be translated to RPA by IOMMU.

Where implementations allowing grouping of devices based on a GroupID, or invalidation commands that can relate to groupings of entries, an invalidate command may have unintended consequences of invalidating translations for other devices within a TLB. This may result in a performance impact, but would not result in incorrect behavior, since a missing translation would be reloaded.

In Virtualization mode, Hypervisor may choose to assign devices to itself for programming. The IOMMU knows that a particular device is assigned to Hypervisor by checking GUID. If GUID=0, then device is assigned to Hypervisor. The Device Address in this case would be translated through the Root I/O Page Table. Similarly, if a GuestOS is executed in Root mode, then the device address is translated through the Root I/O Page Table.

Errors and Error Queues

The IOMMU may encounter errors while processing a device request. The errors are written to the Error Log by the IOMMU. Subsequently, the IOMMU informs the hypervisor of the presence of errors by signaling an interrupt. The Error Log is multiple entry because multiple devices may cause errors simultaneously. The Error Log may be configured to be a fixed size FIFO in the IOMMU. Examine IOMMU Error Types are found in Table 4, below.

TABLE 4

| Error Category | Error Type | Error Description |
| --- | --- | --- |
| IO_PAGE_FAULT | PAGE_INVALID | Page Walk results in invalid PTE. |
| DEV_ACCESS_ERR | DEV_INVALID | DTE[V] = 0 on Device access. |
|  | DEVID_OUT_OF_RANGE | Device ID of IO request is out of range of Device Table. |
|  | DEV_XSLATE_REQ_ERR | Device makes translation request but IOTLB support disabled. |
|  | DEV_XSLATED_REQ_ERR | Device makes request with pre-translated address, but IOTLB support disabled. |
|  | DEV_ADDR_OOR | Device Address is out-of-range as per IOMMU address map. |
| DEVICE_ACCESS_VIOLATION | DEV_WR_PROT | Device makes write request but write access not granted. Includes case where DTE[V] = 0. |
|  | DEV_RD_PROT | Device makes read request but read access not granted. Includes case where DTE[V] = 0. |
|  | DEV_CCA_VIOLATION |  |
| CMDQ_ERR | CMD_INV_ERR | Command encoding is unsupported. |
|  | CMDQ_OVERFLOW | Write to CQTP causes overflow. |
| ELOG_ERR | ELOG_OVERFLOW | Write to ELTP causes overflow. |
| DATA_PROT_ERR | DTE_DBECC_ERR | Double bit error on DTE read |
|  | CMD_DBECC_ERR | Double bit error on CMD read |

An error related to a device will cause processing of that device's requests to stop. Hardware will update a status bit accordingly. Errors also can be flagged in response to non-zero bits in reserved fields.

Memory for the Command Queue and Error Log can be allocated in multiples of 128 entries, in an implementation. A 128-entry allocation provides a relatively fine granularity of allocation; allocations that are more or less granular can be provided in other implementations. In general, any pages related to IOMMU data structures and I/O Page Tables can be pinned in memory to avoid Page Faults.

Access Control and Status Registers (ACSRs)

In the example implementation here, twelve ACSRs are available in the IOMMU. The ACSRs may be placed in a core (e.g., within a CPU system core) or in the IOMMU, in different implementations. Each can be assigned a 64 byte Device Register Block with an ASCR (Access Control and Status Register). Privilege Access Control is determined by bit fields in an ASCR, which enables User/Supervisor/Kernel access. In Virtualization mode, access to an ASCR is only by Hypervisor, whereas in non-Virtualized mode, such access is only by a process that has Kernel privileges.

IOMMU Global Configuration Description

A Global Configuration Register (GCFG) is provided in a Virtualized mode of operation and is accessible by Hypervisor. A single GCFG can be used per IOMMU. Contents of an example GCFG are provided in Table 5, below.

TABLE 5

| Name | Abbrev | R/W | Description | Power On Reset State |
|---|---|---|---|---|
| Device Table Length | DTLEN | RO | Determines number of Device Table Entries as a multiple of the base 128 entries. Size is (DTLEN + 1) multiple of 128. Maximum # of entries: 16 × 128 = 2048. DTLEN in LCFG and GCFG must be equal. | Preset |
| GuestNum | GNUM | RW | The number of Guests supported by the IOMMU. | Preset |
| 64 b vs. 32 b Support H/W | ADM | RO | 1: 64 b Support, w/32 b compatibility mode. 0: 32 b Support | Preset |
| Common Root Page-Table | CRPT | RO | 1: Per-Device Root Page-Table supported. 0: A Common Root Page-Table supported. | 0 |
| Virtualization Enabled | VZEN | RW | 1: Enable Virtualization in IOMMU. 0: Disable Virtualization in IOMMU. | 0 |
| Command and Error Queue Management | CEQM | RO | 1: Command and Error Queues under Guest Management - FullVZ. 0: Command and Error Queues under Hypervisor Management - ParaVZ. | 0 |
| IOMMU Enable Override | ENOV | RW | 1: IOMMU enabled and can service device requests. 0: IOMMU disabled and will not service device requests. | 0 |

The IOMMU does not have to support the logical maximum number of entries specified by DTLEN. Software should write all 1's to field and read back a stored value to determine an actual number of devices supported. Typical implementations may support on the order of 128 entries. Information can be repeated between GCFG and a GuestOS specific Local ConFiGuration register (LCFG). For example, 64/32 bit hardware support can be indicated in both GCFG and in LCFG. Duplicating such values eases access to those values by different processes, such as the hypervisor. In this example, GCFG[GNUM] is 8 bits to allow for support for up to 255 Guests. This number can be linked to a maximum number of architectural threads supported in an architecture in which the IOMMU will be used (under a circumstance where there is pre-defined ratio (e.g., 1:1) between GuestOSes and threads). A ratio of GuestOS to threads does not have to be 1:1.

In an implementation, a Common Root Page Table shared by GuestOSes is a default. If an implementation supports only a Common Root Page Table, then GCFG[CRPT] is tied to 0, and can be read for capability determination. Command and Error Queues may be managed by either the Guest or Hypervisor. Guest Management is Fully-Virtualized, whereas Hypervisor Management is considered Para-Virtualized, from the perspective of the IOMMU. GCFG[CEQM] is used to indicate hardware support. Hardware may provide only Hypervisor-managed support in which case GCFG[CEQM] is tied to 0. Even if hardware supports full virtualization, software may run in a para-virtualized mode, by using only set of hardware available with GNUM=0.

A number of GuestOSes supported by hardware is in GCFG[GNUM]. Software can discover how many GuestOSes are supported by hardware by writing all 1's to this field and reading a value ultimately stored there. In Virtualization mode, when GCFG[CEQM]=1, then the number of sets of Command+Error Queues is GNUM+1, with one additional for the Hypervisor. In para-virtualization (GCFG[CEQM]=0), one set of Command+Error Queues is required for the Hypervisor.

In some fully-virtualized implementations, each Guest may address its own set of CSRs with the same address that another Guest does. The Guests can be dealiased by IOMMU using a GuestID.

For an IOMMU implementation that does not support Virtualization, VZEN is tied to 0. In an implementation of the IOMMU with hardware support for virtualization, if operating in a non-virtualized mode, then a hardware page walker (if provided) makes only one pass of a Root/Guest shared TLB or translates only through Root TLB w/ non-shared TLB to obtain PA that maps to provided Device Address.

IOMMU Local Configuration Register Description

The "Local" Configuration Register (LCFG) can be multiple instances per IOMMU. For example, it would be replicated per Guest if GCFG[VZEN]=1 & GCFG[CEQM]=1. The number of Guests is determined by GCFG[GNUM]. Each Guest will have its own configuration register, command queue, error log, and associated base addresses (where these structures are memory resident) and head/tail pointers. The MMIO addresses for these structures is the same for all guests, except the accesses to such memory addresses are differentiated and/or disambiguated by GuestID, which the originating core sends with a memory transaction setup request. If the IOMMU is in a Virtualization mode, then Hypervisor has a Command Queue and Error Log, (and thus for a fully virtualized mode, a total number of sets of these data structures is GCFG[GNUM]+1). Contents of an example LCFG register are depicted in Table 6, below.

TABLE 6

| Name | Abbrv. | R/W | Description | Power-On Reset State | Pre-Enable State |
|---|---|---|---|---|---|
| Device Table Length | DTLEN | RO | Determines number of Device Table Entries as a multiple of the base 128 entries. Size is (DTLEN + 1) multiple of 128. Maximum # of entries: 16 × 128 = 2048. | Preset | N/A |

TABLE 6-continued

| Name | Abbrv. | R/W | Description | Power-On Reset State | Pre-Enable State |
|---|---|---|---|---|---|
| Comman Queue Length | CMQLEN | RO | Length, or # of entries in Command Queue. Size is (CMQLEN + 1) multiple of 128. Maximum # of entries: 8 × 128 = 1024. | Preset | N/A |
| Error Log Length | ELGLEN | RO | Length, or # of entries in Error Log. Size is (ELGLEN + 1) multiple of 128. Maximum # of entries: 8 × 128 = 1024 | Preset | N/A |
| 32 b Compatibility Enable | ADMEN | RW/RO | 1: 64 b software on 64 b IOMMU 0: 32 b compatibility mode enabled on 64 b IOMMU RW if ADM = 1, RO as 0 if ADM = 0. | X/O | N/A |
| 64 b vs. 32 b Support H/W | ADM | RO | 1: 64 b Support, w/32 b compatibility mode. 0: 32 b Support | Preset | N/A |
| SYNC Command Completion Interrupt Enable | SYIEN | RW | 1: Interrupt signaled if SYNC Command Completion Interrupt set in Status Register 0: Interrupt signaling disabled. | 0 | N/A |
| Error Log Interrupt Enable | ELGIEN | RW | 1: Error Log Interrupt enabled 0: Error Log Interrupt disabled | 0 | N/A |
| Command Queue Enable | CMQEN | RW | 1: Command Queue enabled 0: Command Queue disabled | 0 | Command Queue Base, Head & Tail Pointers must be valid. |
| Error Logging Enable | ELGEN | RW | 1: Error Logging enabled 0: Error Logging disabled | 0 | Event Log Base, Head & Tail Pointers must be valid. |
| IOMMU Enable | EN | RW | 1: IOMMU enabled and can service device requests. 0: IOMMU disabled and will not service device requests. | 0 | N/A |

Pre-Enable State means an additional state that must be valid before enable is set. SYIEN, ELGIEN, CMQEN, ELGEN must be explicitly set before a device is enabled by software.

To avoid accidental/malicious overwrites of memory by software in Virtualization mode of Command Queue or Error Log contents, Hypervisor can allocate memory for these structures equal to the maximum of each of Command and Error Log (such that no guest would have write permissions outside of that allocated space, which would be entirely consumed by its own CQ or error log, and thus subject to appropriate permissions checking).

A write to CMQEN empties the command queue and initializes both CQHP & CQTP to 0. Setting STATUS [CMQRA] indicates that reads are active. A write to ELGEN empties the error log and initializes both ELHP & ELTP to 0. Setting STATUS[ELGWA] to 1 makes writes active.

IOMMU Status Register Description

TABLE 7

| Name | Abbrev | R/W | Description | Power-On Reset State | Post-Set Action |
|---|---|---|---|---|---|
| Error Log Overflow | ELGOV | RW1C | 1: IOMMU has run out of usable error log entries. Error logging frozen until bit cleared - subsequent events discarded. Interrupt signaled if LCFG[ELGIEN] is set 0: Error log has not overflowed. Unused entries available to write. ELGOV has been added for Debug | 0 | software writes 1 to clear. |
| Command Queue Read Active | CMQRA | RO | 1: Command Queue reads active. 0: Command Queue reads stopped due to error condition on commands, or reset. Error condition is logged in Error Log. | 0 | To enable/restart queue, software must write LCFG[CMQEN], once it has serviced error. This sets CMQRA to 1. |
| Error Log Write Active | ELGWA | RO | 1: Error Log writes active. 0: Error Log writes stopped due to overflow, or reset. | 0 | To enable/restart queue, software must write LCFG[ELGEN], once it has serviced error. This sets ELGWA to 1. |
| SYNC Command Interrupt | SYNINT | RW1C | 1: SYNC Command requires interrupt service on completion. 0: SYNC Command completion event has not occurred since last clear of bit (or reset). | 0 | software writes 1 to clear. |
| Error Log Interrupt | ELGINT | RW1C | 1: Error Log interrupt posted on event write. 0: Error Log write has not occurred since last clear of bit (or reset). | 0 | software writes 1 to clear, once it has serviced logged event. |

As shown in Table 7, Post-Set Action dictates how software can change a status bit once set, either by a direct or indirect write. SYNC Command format specifies whether an interrupt needs to be signaled on completion of SYNC. It can alternatively update a semaphore in memory. Reset state of both CMQRA and ELGWA is 0. Some implementations can require software to enable both Command Queue and Error Log by writing 1 to LCFG[CMQEN] and LCFG[ELGEN]. This will cause both CMQRA and ELGWA to be set to 1.

Access Permission for IOMMU CSRs

Access to CSRs can be controlled according to privileges set through a privileged mode architecture specification. An example of such access control is found in Table 8, below. In Table 8, the 'Address' column shows how the IOMMU is to interpret addresses. Because in this example, the IOMMU does not have access to CPU page tables, the addresses are always physical, being either GPA or RPA. The Device Table Base Address (DTBA) is always a Physical Address. In an IOMMU implementation that includes a page table walker, DTBA can be a GPA. If a GPA, then the IOMMU will translate with a Page Walk of Root Page Table. If the IOMMU does not include a page table walker, then DTBA is an RPA. In an example, a minimum size of a Device Table is 128 entries of 128b each in 64b mode, and 128 entries of 64b each in 32b mode, and a maximum size is 16 times the minimum size.

8×2 KB=16 KB. An example minimum size for a 32b IOMMU is 128×8B=1 KB and a maximum size is 8×1 KB=8 KB.

The CMD Queue Head Pointer is read only for software and also is read by the IOMMU. If the head and tail pointers are not equal, then unread commands are present in the Command Queue. The IOMMU will increment the head pointer for each command that is read. CQHP read requests are always issued as coherent.

Commands in general do not need to be read serially based on completion. Software must follow up non-SYNC commands with a SYNC command if software needs to ensure completion. The semantics of completion are visible with respect to local and possibly remote caches of translations, but are globally visible events.

In a fully virtualized mode (GCFG[CEQM]=1 as shown above), Guests may write CQTP. With GCFG[CEQM]=0, Hypervisor writes CQTP. The tail pointer is updated when software wants the IOMMU to read commands, so that software can write multiple commands and then increment the tail pointer by the number of commands written. In an implementation, CQTP write requests by a Guest are issued as coherent by default.

CQTP and CQHP can be treated as signed pointers since the buffer is circular. On wraparound of a pointer, the sign bit must be flipped. In non-Virtualization mode, LCFG

TABLE 8

| | Access Permission | | | Address (IOMMU) | | |
|---|---|---|---|---|---|---|
| | Non-VZ Mode | VZ-Mode (VZEN = 1) | | | VZ-Mode | |
| IOMMU CSR Name | (VZEN = O) | CEQM = 1 | CEQM = 0 | Non-VZ Mode | Guest Manage | Hypervisor |
| Device Table Base Addr. (DTBA) | Kernel | Guest(Kern) | Root | PA | GPA | RPA |
| Command Queue Base Address | Kernel | Guest(Kern) | Root | PA | GPA | RPA |
| Command Queue Tail Ptr. (CQTP) | Kernel | Guest(Kern) | Root | N/A | N/A | N/A |
| Command Queue Head Pointer | Kernel | Guest(Kern) | Root | N/A | N/A | N/A |
| Error Log Base Address (ELBA) | Kernel | Guest(Kern) | Root | PA | GPA | RPA |
| Error Log Tail Pointer (ELTP) | Kernel | Guest(Kern) | Root | N/A | N/A | N/A |
| Error Log Head Pointer (ELHP) | Kernel | Guest(Kern) | Root | N/A | N/A | N/A |
| Local Configuration (LCFG) | Kernel | Guest(Kern) | Root | N/A | N/A | N/A |
| Status (STATUS) | Kernel | Guest(Kern) | Root | N/A | N/A | N/A |
| Global Configuration (GCFG) | N/A | Root Only | Root | N/A | N/A | N/A |
| Root Page Table Base Address | N/A | Root Only | Root | PA | RPA | RPA |
| Device Remapping Table Base | N/A | Root Only | N/A | PA | RPA | RPA |

RPTBA is only required for Virtualization. RPTBA is always an RPA. There is only one RPTBA, regardless of number of simultaneously existing Guests. Hypervisor can be configured to merge Guest Physical to Root Physical Address pages into this common Root Table across all Guests. Such also applies to an OS executed in Root Mode with RVA as its Virtual Address.

An example implementation provides a minimum size for a 64b IOMMU of 128×16B=2 KB and a maximum size of

[CMQLEN] determines wraparound point. On write of CQTP by software, hardware detects wraparound and sets sign bit accordingly.

Error Log Base Address Register (ELBA) is a Physical Address. In a virtualization mode, Hypervisor has an ELBA, ELHP, and ELTP, and in a fully virtualized mode (GCFG[CEQM]=1), each Guest has its own copy of ELBA, ELHP, and ELTP.

The Error Log Head Pointer (ELHP) is read by software. In full virtualization mode (GCFG[CEQM]=1), Guests can read their respective ELHP. When not in full virtualization mode (GCFG[CEQM]=0), Hypervisor reads ELHP. In an implementation, ELHP read requests are always issued as coherent by IOMMU.

An Error Log Tail Pointer (ELTP) is written by IOMMU. If the head and tail pointers are not equal, then errors are present in the Error log which software needs to read. IOMMU may choose to write multiple errors in the Error Log before incrementing the tail pointer. ELTP write request are always issued as coherent by IOMMU. ELTP and ELHP are treated as signed pointers since the buffer is circular. On wraparound of pointer, the sign bit is flipped. In non-Virtualization mode, LCFG[ELGLEN] determines wraparound point.

The above example related to an IOMMU implementation where command and error queues could be provided for each GuestOS and a hypervisor. However, other implementations may provide a memory mapped I/O location for a GuestOS to store a command to be executed, rather than providing a queue. Still further implementations may provide that hypervisor communicates with GuestOSes, and provides a relatively static mapping for address translations in the IOMMU. Such an implementation may be particularly appropriate where the IOMMU does not provide a hardware page table walking capability.

An error status register may be provided, which indicates a device ID, a size of the DMA request, a count of errors of this type, a type of device address (e.g., GPA, mapped or unmapped RVA), an error type (e.g., no matching TLB entry, no read or write permission, matching TLB entry is invalid, device table entry is invalid, or a specified device identifier is out of range of the device table), an indication that the error log has overflowed, and whether the error has been reported to the core or CPU. When a new error arises, the IOMMU may be configured to combine that error with another error of the same type that exists in the queue and increment the error count.

TLB Configuration

In addition to the above configuration capabilities, the TLB may be configured to support a fixed page size. For example, fixed page sizes from 4 KB to 256 TB may be supported in powers of 2. A hypervisor can set a minimum page size that is allowed to be established for a TLB entry. A set associativity of the TLB also can be configured as a build option. As an example, the TLB can be set up to be in a direct-mapped mode through 16-way associative mapping. A number of sets for each way also can be a build mode option, and can vary from 16 to 2048 in an example. In some implementations, the TLB also may be configured to support variable page sizes among different entries. These capabilities may be indicated (if hardware build option) or set (if capable of being adjusted in software) in a TLB configuration register.

Memory Coherency

Implementations according to the disclosure may implement memory coherency requirements as follows. In an implementation, any writes to memory-based data structures (Device Table, Command Queue, Error Log) will be treated as cached coherent. This allows visibility in the L2 cache, which the IOMMU (e.g., IOMMU 21) will access through an IOCU (e.g., IOCU 20 or 66). These writes may be initiated by software (to Device Table, Command Queue) or by IOMMU (to Error Log). A Cache Coherency Attribute (CCA) of IOMMU write may follow semantics of a write invalidate, as defined in a relevant architecture specification (e.g., a MIPS™ Coherence Protocol Specification).

Any reads by software of Error Log are similarly cached coherent. Any reads by IOMMU (from Command Queue) are cached coherent and are always discarded after read and interpretation. In an example, the Cache Coherency Attributes (CCA) of IOMMU reads may follow semantics of a read to discard defined in a relevant architecture specification. There is no concept of "ownership" of data in the IOMMU, even though data may be cached temporarily (i.e., data in IOMMU is not snooped). It is the responsibility of software to ensure any data is flushed from the IOMMU using invalidate commands before that data address is reused.

Device DMA transactions inherent the CCA attributes provided by an OCP command. IOMMU will not modify the CCA except in that a hypervisor may override a guest through its Device Table entry and impose a coherent attribute on a guest non-coherent attribute for access protection purposes. Writes to Error Log by IOMMU require that the write be globally visible in hardware before the ELTP (Error Log Tail Pointer) is updated and interrupt signaled by IOMMU. Otherwise software may attempt a read and a race between software read and hardware write may result in inconsistent data. Similarly, software can only update the CQTP (Command Queue Tail Pointer) in the IOMMU once the corresponding write is globally visible. Otherwise the IOMMU may read stale data from CQHP (Command Queue Head Pointer).

Figure 5:
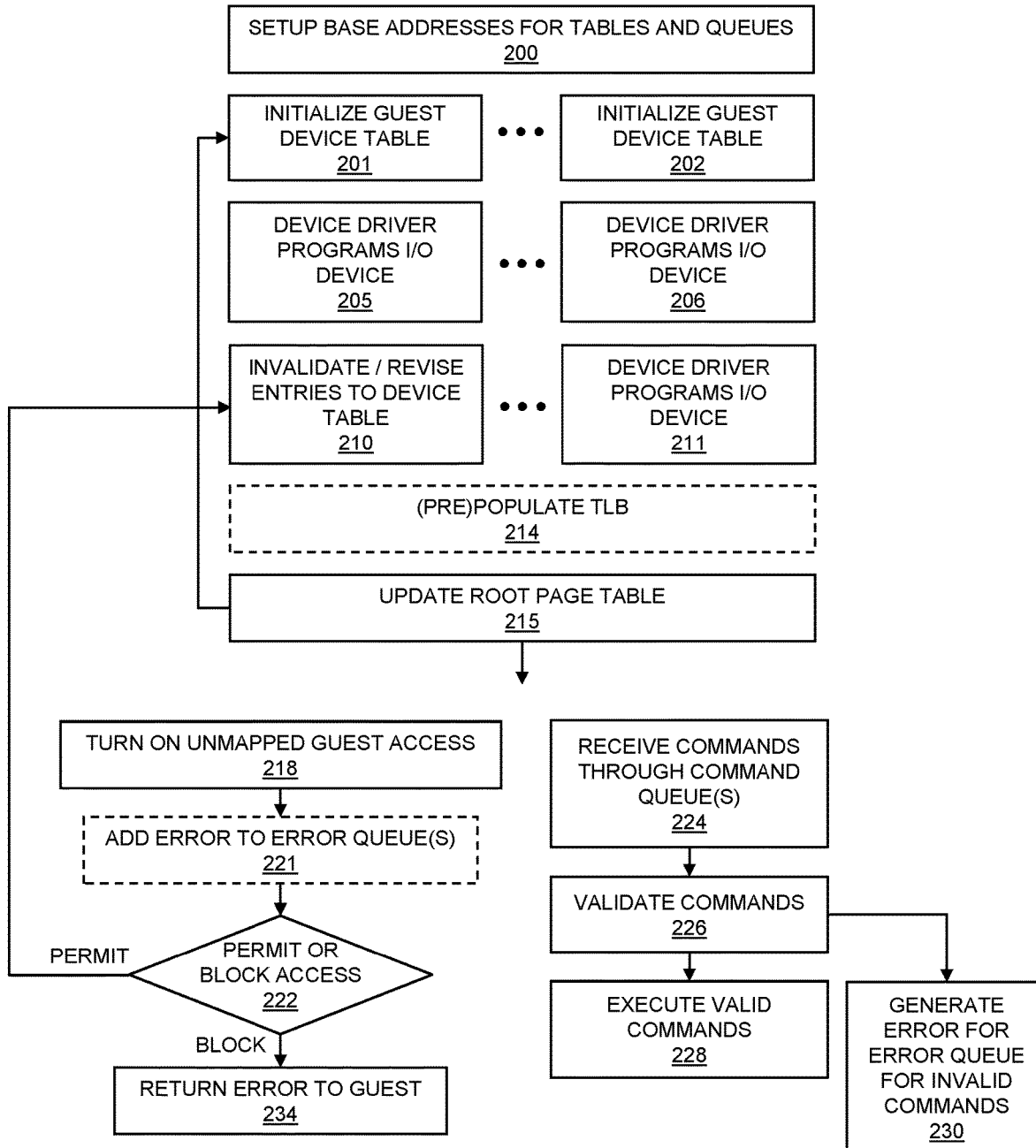
FIG. 5 depicts an example process in which a hypervisor and IOMMU can handle guest programming of I/O device DMA.

FIG. 5 depicts an example of how IOMMU 112 can be set up, in order to service a plurality of GuestOSes in a fully-virtualized mode in which GuestOSes may have and manage individual device tables. At 200, hypervisor 110 can setup base addresses in memory for the tables and queues that will be used during operation. This pertains to an implementation where such tables and queues are memory-resident; these include command and error queues for hypervisor 110 and/or guests (156, 158), as well as the RDRT 162, root page table 160, and guest-specific device 152 and page tables 154, to the extent used. The physical addresses pertaining to these data structures can be stored within registers in IOMMU 112, as explained above. In some implementations, all of these elements, or some portion of them, may be implemented within private memories of IOMMU 112, and in these implementations, base addresses would not need to be set up, but an initialization procedure may be performed.

At 201-202, a device table for each guest can be initialized at the addresses determined. At 205-206, a device driver within each guest can program I/O devices that are assigned to that guest. As guests require access to different I/O devices, the device tables (and RDRT 162) will be updated, with entries being invalidated or revised at 210-211. At 214, TLB can be updated using pre-fetch commands issued from different guests or hypervisor 110. At 215, a root page table is maintained based on entries made to guest-specific page tables and changes made by the hypervisor to the root page table. These process portions may be performed in an order different than presented; some portions may be omitted in some implementations, while in others, additional actions may be taken. In general, the base addresses for the tables and queues would not change during normal operation, and so, this action may not need to be repeated. However, the remaining actions described may be repeated, as guests context-switch and require access to different I/O devices over time (depicted with the arrow returning from 215 to 201).

With respect to actions taken by the IOMMU 112, IOMMU 112 can trap, at 218, to hypervisor 110 on an unmapped guest access to memory, by generating, at 221, an error that is stored in an error queue read by hypervisor 110.

Hypervisor 110 determines whether or not such access should be permitted 222, and if permitted, then proceeds to make appropriate adjustments to RDRT 162, showing that the guest generating the access is permitted to do so. Then, on a subsequent attempt to access that address, IOMMU 112 will permit access. Such access can be for adding entries to a device table or page table for that guest. As will be explained later, these entries added by a guest still will be qualified against information maintained by hypervisor 110 in RDRT 162. If the access is unauthorized, then hypervisor 110 can return an error to that guest, at 124.

IOMMU also can receive, at 224, commands from hypervisor 110 and guests to maintain translation information stored in IOMMU 112. For a received command, IOMMU 112 validates such command 226, and if valid, executes 228 such, and otherwise generates an error to be placed in an appropriate error queue, at 230. Examples of commands that can be received and processed by an implementation of IOMMU 112 are found in Table 3 above. Some implementations may not permit guests to generate commands directly to IOMMU, but rather must use hypervisor 110 to effect any operations or changes, although after a particular set of mappings are setup, specific requests can proceed within those mappings without hypervisor intervention. As such, commands do not indicate specific I/O requests, but rather affect permissions and mappings.

Figure 6:
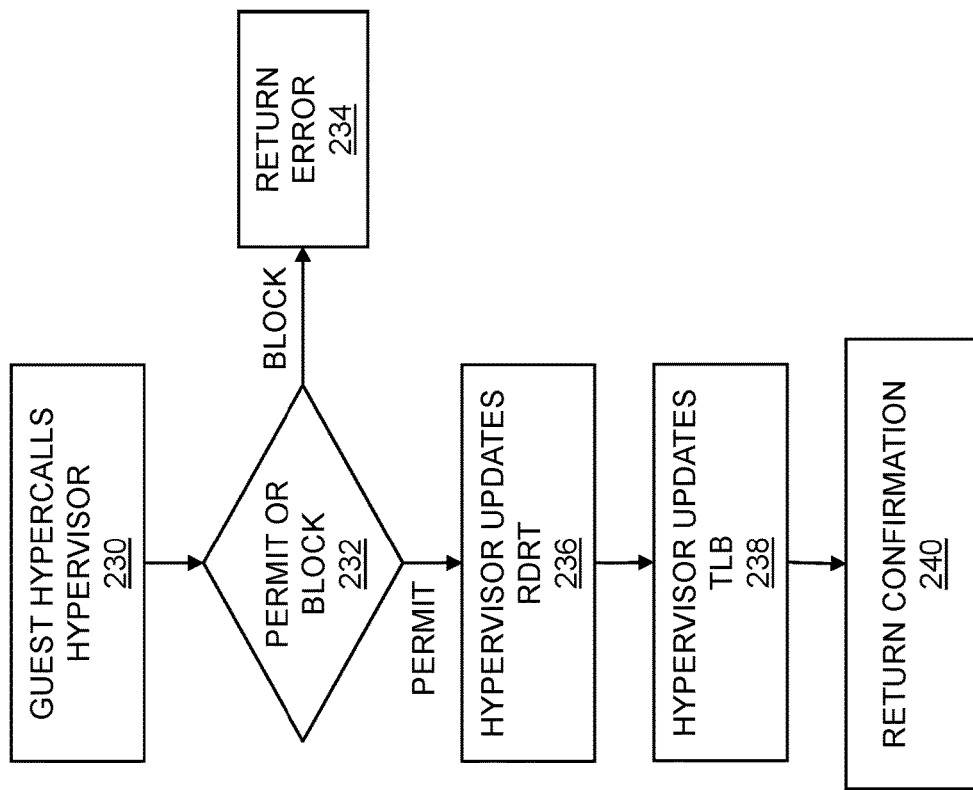
FIG. 6 depicts an example process that may be implemented for a software-managed IOMMU.

FIG. 6 depicts an example process according to an alternative implementation, in which a guest hypercalls hypervisor 110 to effect a change to IOMMU 112. Hypervisor 110 determines whether to permit or block such change, at 232, and if permitted, the hypervisor either generates a command (e.g., to direct IOMMU to invalidate or pre-fetch a TLB entry, at 238) or directly updates an appropriate memory-mapped location to effect such change (e.g., to update a device table or page table, such as RDRT 162, at 236). Some implementations may not provide per-guest device tables, and in those situations, RDRT 162 may simply be referred to as a root device table or a device table, but still serves the function of providing IOMMU 112 information for qualifying I/O accesses. At 240, the hypervisor can return a confirmation that a requested change was made, or at 234, an error can be returned if the requested change was blocked.

Figure 7:
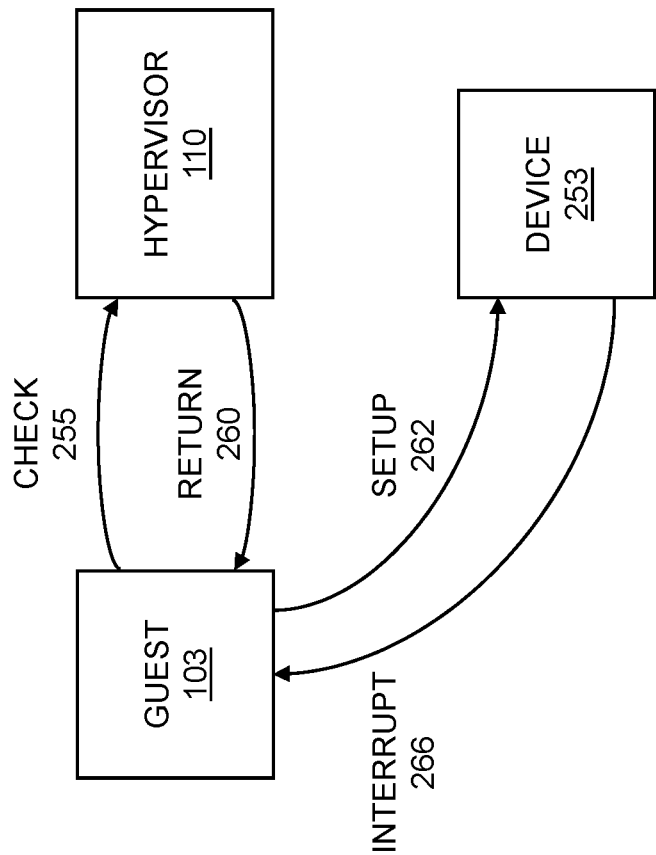
FIG. 7 depicts an example interaction among a guest, hypervisor, and I/O device for a device DMA.

FIG. 7 depicts an example of information flow among a guest 103, hypervisor 110, and an I/O device 253. Guest 103 generates a check message 255 received by hypervisor 110 concerning permission to program I/O device 253 to undertake a particular action. This can be a hypercall message or a trapped access, as explained above. Hypervisor 260 returns a permission indication. Subsequently, setup 262 of I/O device 253 is performed (e.g., a transaction is specified in terms of data to load into a GPA). Thereafter, I/O device 253 performs this transaction, going through IOMMU, as explained further in FIG. 7, and then returns an interrupt 266 or other message to guest 103 to indicate completion of the transaction.

Figure 8:
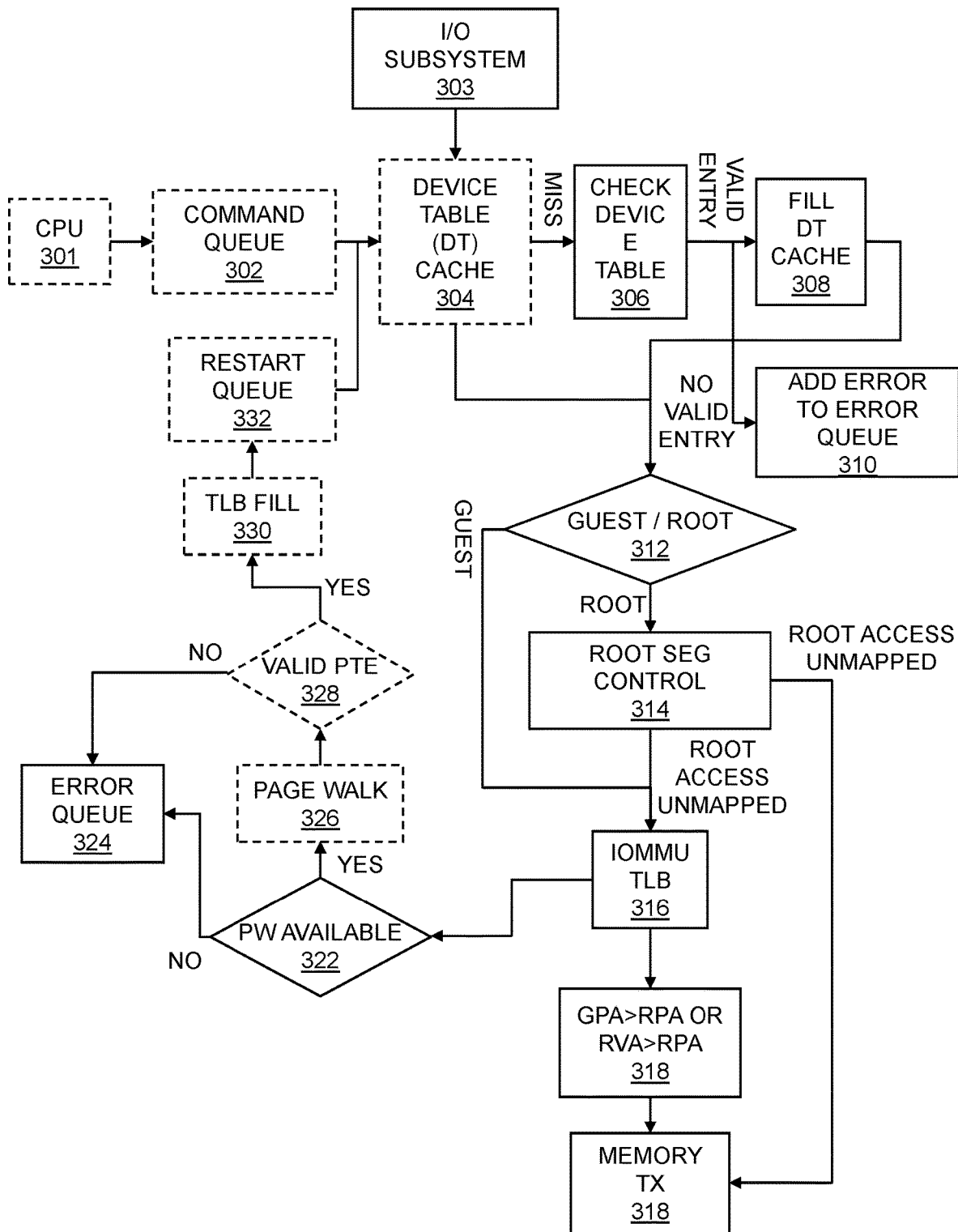
FIG. 8 depicts an example process by which an IOMMU according to the disclosure processes I/O device DMA requests.

FIG. 8 depicts an example of a process undertaken by an implementation of IOMMU 112. CPU 301 generates commands that arrive at a command queue 302, these commands can be for initiating changes to IOMMU 112 state, as discussed above. However, command queue 302 is optional. CPU 301 here represents software executing on CPU 301 to generate such commands. Additionally, I/O subsystem 303 generates transactions that need to be serviced by IOMMU 112. These transactions initially cause a check on a device table cache 304, to determine whether a device address has a cached entry. Device table cache 304 also is optional. If there was a hit in cache 304, at 312, a determination whether the transaction is for a guest or root address is made. If there was a miss in cache 304, at 306, the full device table is checked, and if a valid entry is identified, that entry is filled in the cache at 308 (if the cache is present). Otherwise, at 310, an error is generated. If there was a valid entry, then the determination at 312 is made. The determination at 312 involves using the retrieved information from the device table, examples of which were provided above in Table 2. If the address is a guest address, then, at 316, the address is translated through TLB 128. If the address is a root address, then a root segment control function can be performed at 314, which determines whether the root address is mapped or unmapped. If the address is mapped, then it will be translated in TLB 128 at 316 also. Otherwise, an unmapped address is used directly as a GPA 318 to initiate (permit) a memory transaction specified by the request, at 320. Such segment mapping can be provided where an underlying privileged resource mode architecture provides a separation between kernel and user mode memory segments, such that these segments can be remapped to appropriate locations within system memory for each guest.

If the TLB 128 has no matching entry, then a determination whether IOMMU has a page walker can be made, at 322 (this can be implemented by checking a configuration bit in a configuration register, as explained above). Determinations such as this can be implemented by hardware logic that inputs such configuration bit within a logic function, and as such, a determination is not necessarily a discrete or separately identifiable event. If there is no page walker, then, at 324, an error is generated for an error queue. If there is a page walker, then at 326, a page walk occurs. If there is a valid entry, as determined at 328, then TLB 128 is filled with that entry at 330, and then the transaction can be entered into a restart queue at 332. If there was no valid entry, then an error is generated at 324. If there is no page walker, then actions 326, 328, 330, and 332 would not be performed. Returning to 316, where the TLB has an entry, then the contents of that entry provides at least one of a GPA to RPA translation or a RVA to RPA translation. The resulting RPA is used, at 320, to initiate (permit) the memory transaction.

Software-Managed IOMMU

The example presented relative to FIGS. 2-3 primarily related to implementations in which command queues can be provided so that GuestOSes could enqueue commands directly to the IOMMU, and also showed an IOMMU with a page table walking capability.

The ACSR registers described herein may have an addressing scheme specified by a privileged mode architecture description. Such architecture description may require that any software resource attempting to read and/or write such registers obey privileged resource access controls and have appropriate permissions.

FIG. 4A depicts an example of a hypervisor-managed implementation of IOMMU 112 (meaning, for example, that a TLB is not populated by page walking), in which data used by IOMMU 112 are located within system memory 150, and registers within IOMMU 112 contain addresses mapping to respective locations within system memory 150 storing data for each identified type of data. Hypervisor 110 may execute on a processor, which is implemented in circuitry that is physically and/or logically separate from circuitry implementing IOMMU 112, and may communicate with IOMMU 112 through memory 150 in the example of FIG. 4A. Such communicate may include storing data at locations in memory 150 identified as being allocated for those purposes. In particular, a register 165 may identify a memory location 176 from which a command may be read (or a pair of registers may identify a head and a tail of a command queue, as another example), a root device table register 171 identifies where root device table 180 is located in memory 150, a register identifies a base address 172 of an error log 177. One or more registers 169 may refer to memory locations storing configuration data 192. Segment control registers 134 or 174 may be located in IOMMU 112, even where many other elements of data are stored in memory 150 and mappings maintained thereto, as described above. FIG. 4A also depicts presence of logic/circuitry 131 that implements the processes described herein, with respect to the data depicted.

FIG. 4B depicts an example of an implementation of IOMMU 112, in which data used by IOMMU 112 are located within memory embedded within IOMMU 112 (i.e., not stored in a separate general purpose memory and referenced by a memory mapping, as in FIG. 4A). In the example of FIG. 4B, IOMMU 112 includes a TLB 128, which can be maintained by hypervisor 110 (and if a page walker is provided in IOMMU 112, then by or also by the page walker). A root device table 180 is maintained by hypervisor 110 and stores mappings between device addresses and guest information (as described above). A command register 178 can be written by hypervisor 110 and can be used to effect commands that would have been provided to a command queue as in previous examples. Commands can be written one after another to command register 178. Each command may follow setup of multiple data registers, such as loading or storing data in root device table 180.

An error status register 194 may be provided to maintain a current error status, but may not maintain a record of prior status changes. A set of control/configuration registers 188 can be provided, which track such configuration as fixed page size, set associativity, cache ways, interrupt enabling, number of device table entries, presence of page walker functionality, and so on.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described. Additionally, various examples of sizes for certain data fields, register layouts and other implementation details were provided. However, these examples do not limit the scope of implementations according to the disclosure. Also, for clarity, structures that are used for certain purposes were given names and/or abbreviations used in the disclosure; however, these names do not per se restrict the scope of implementations according to the disclosure. Also, the way that status, errors, or other conditions were conveyed through the setting of certain bits or bit fields to defined values is an example convention and other implementations are possible.

Aspects of functions, and methods described and/or claimed may be implemented in a special purpose or general-purpose computer including computer hardware, as discussed in greater detail below. Such hardware, firmware, and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets, embedded systems, and the like.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, System C Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases terminology has been used herein because it is considered to more reasonably convey salient points to a person of ordinary skill, but such terminology should not be considered to impliedly limit a range of implementations encompassed by disclosed examples and other aspects. For example, various examples of configuration and status registers were disclosed, along with various abbreviations and other example implementations. This disclosure is not by way of limitation. These examples are also not to the exclusion of additional features or functions, availability of other information or status conditions, and so on.

By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

What is claimed is:

1. An apparatus for performing computation, comprising:
a physical processor element capable of being configured to execute a hypervisor that hosts one or more guest Operating Systems (OS) by presenting a respective virtualized machine interface to each hosted guest OS;
a physical memory;
an Input/Output (I/O) device; and
an I/O Memory Management Unit (IOMMU) coupled to the physical processor element, the IOMMU configured to:
receive from the hypervisor a direct mapping between a guest address for a hosted guest OS, and an address in the physical memory;
store the mapping in a Translation Lookaside Buffer (TLB) maintained within the IOMMU, wherein the hypervisor manages contents of the TLB;
store a mapping in a device table between a guest identifier for the guest OS and an identifier for the I/O device, wherein each of the one or more guest Operating Systems are associated with a separate device table and the mapping in a specific device table is created by the Operating System associated with that device table;
store a mapping in a device remap table between a guest identifier for the guest OS and an identifier for the I/O device, wherein the mapping in the device remap table is created by the hypervisor;
receive from the I/O device a request to access the physical memory, the request specifying an identifier for the I/O device, and responsive to receiving the request, to lookup the specified I/O device identifier in the device table; and
when a mapping between the I/O device identifier and a guest identifier is found in the device table, then initiate fulfillment of the I/O device request;
when a mapping between the I/O device identifier and a guest identifier is not found in the device table, then query the device remap table to determine whether to fulfill the I/O device request; and
when a mapping between the I/O device identifier and a guest identifier is not found in the device table or in the device remap table, then initiate a request to the hypervisor to determine whether to fulfill the I/O device request.

2. The apparatus for performing computation of claim 1, wherein the IOMMU is configured to initiate fulfillment of the I/O device request by forwarding data relating to the I/O device request to a cache hierarchy.

3. The apparatus for performing computation of claim 1, wherein the IOMMU is configured to initiate fulfillment of the I/O device request by returning the physical address to a controller.

4. The apparatus for performing computation of claim 1, further comprising a Translation Lookaside Buffer (TLB) populated with entries from the IOMMU, the TLB coupled with a Graphics Processing Unit (GPU) configured to use the TLP to map virtual addresses used by the GPU to physical addresses in the physical memory.

5. The apparatus for performing computation of claim 4, wherein the TLB is read only by the GPU.

6. The apparatus for performing computation of claim 5, wherein the GPU is configured to request an update to entries in the TLB.

7. The apparatus for performing computation of claim 6, wherein the GPU is configured to send requests to the hypervisor, which, responsive to determining that the GPU may validly access portions of the physical memory identified in the requests, communicates with the IOMMU to service the requests.

8. The apparatus for performing computation of claim 4, wherein the GPU is configured to map a guest virtual address to a guest physical address, and provide that the guest physical address for translation into a physical address in the physical memory.

9. The apparatus for performing computation of claim 1, wherein if the device table comprises a matching entry, then to obtain a guest identifier from the matching entry, and use that obtained guest identifier and a device address provided with the request to index the TLB to determine an address in the physical memory that corresponds to the device address.

10. An Input/Output Memory Management Unit (IOMMU) comprising:
a device table storing entries mapping respective identifiers to respective I/O devices, each guest identifier identifying one of one or more Guest Operating Systems (OS) executing on a processor coupled with the IOMMU, and indicating read and writing permissions to be accorded the I/O device, wherein each of the one or more guest Operating Systems are associated with a separate device table and the mapping in a specific device table is created by the Operating System associated with that device table;
a Translation Lookaside Buffer (TLB) storing entries directly mapping device addresses supplied in I/O device requests to physical addresses within a system memory, wherein a hypervisor manages contents of the TLB;
a device remap table storing entries mapping guest identifiers to I/O devices, wherein the entries in the device remap table are created by the hypervisor; and
circuitry configured to:
receive an I/O device request;
verify that the I/O device request maps to a valid guest identifier using the device table; and
when the I/O device request does map to a valid guest identifier in the device table, then use the TLB to identify a physical address corresponding to a device address supplied in the received I/O device request;
when the I/O device request does not map to a valid guest identifier in the device table, then query the device remap table to determine whether the I/O device request maps to a valid guest identifier in the device remap table; and
when the I/O device request does not map to a valid guest identifier in the device table or in the device remap table, then initiate a request to the hypervisor to determine whether to fulfill the I/O device request.

11. The Input/Output Memory Management Unit (IOMMU) of claim 10, wherein the device address supplied with the I/O device request is a guest physical address.

12. The Input/Output Memory Management Unit (IOMMU) of claim 10, further comprising a command queue for receiving, from the hypervisor, commands to program the TLB with entries.

13. The Input/Output Memory Management Unit (IOMMU) of claim 10, further comprising one or more registers coupled for receiving commands to program the TLB with entries.

14. The Input/Output Memory Management Unit (IOMMU) of claim 10, further comprising a memory and one or more pointers to locations in the memory at which are stored commands to program the TLB with entries.

15. The Input/Output Memory Management Unit (IOMMU) of claim 10, wherein the IOMMU is configured to determine if an I/O device request is associated with a privileged mode of execution, and if so, then to bypass translation of an address specified by the I/O device request and to use the address as a root physical address.

16. The Input/Output Memory Management Unit (IOMMU) of claim 10, wherein entries of the TLB comprise a respective group identifier, and any I/O device specifying a given group identifier can share TLB entries having that group identifier.

17. The Input/Output Memory Management Unit (IOMMU) of claim 16, wherein the IOMMU is configured to receive a command to invalidate all TLB entries corresponding to a specified group identifier and responsively to set all TLB entries matching to that group identifier to invalid.

18. The Input/Output Memory Management Unit (IOMMU) of claim 16, wherein the group identifier is obtained from a device table maintained by the IOMMU, which tracks device-specific permissions to be accorded to a particular guest identifiers.

19. The Input/Output Memory Management Unit (IOMMU) of claim 10, wherein one or more entries of the TLB comprise both a device identifier and a group identifier.

20. The Input/Output Memory Management Unit (IOMMU) of claim 10, further comprising a TLB configuration register comprising a field for setting a page size applicable to entries in the TLB.

21. The Input/Output Memory Management Unit (IOMMU) of claim 10, wherein the TLB supports entries having a fixed page size or a variable page size.

22. The Input/Output Memory Unit (IOMMU) of claim 10, wherein the IOMMU is further configured to receive a request from a GuestOS to program an I/O device, obtain a guest identifier from the request, and use the device table to determine whether that guest identifier has authorization to access that I/O device.

23. The Input/Output Memory Management Unit (IOMMU) of claim 10, further comprising an error queue for signaling when the I/O device has insufficient permission to complete the I/O device request, based on the read and write permissions in the device table entry.

24. The Input/Output Memory Management Unit (IOMMU) of claim 10, further comprising a register storing a pointer to a location in a memory at which an error queue is located, said error queue signaling, based on the read and write permissions in the device table entry, when the I/O device has insufficient permission to complete the I/O device request.

25. The Input/Output Memory Management Unit (IOMMU) of claim 10, wherein the IOMMU is configured to receive synchronization commands that bracket one or more other commands, and after completing the one or more other commands, to signal to a process that generated the one or more other commands that those commands are completed.

26. The Input/Output Memory Management Unit (IOMMU) of claim 10, wherein the IOMMU is configured to receive a prefetch command, which indicates that a page table entry for a particular device address to physical address is to be loaded into the TLB.

* * * * *